US012632528B2

(12) United States Patent
Asai et al.

(10) Patent No.: US 12,632,528 B2
(45) Date of Patent: May 19, 2026

(54) INFORMATION PROCESSING DEVICE, AND INFORMATION PROCESSING METHOD

(71) Applicants: TOYOTA JIDOSHA KABUSHIKI KAISHA, Toyota (JP); NEC Corporation, Tokyo (JP)

(72) Inventors: Shimpei Asai, Okazaki (JP); Kouji Oosugi, Minato-ku (JP)

(73) Assignees: TOYOTA JIDOSHA KABUSHIKI KAISHA, Toyota (JP); NEC Corporation, Tokyo (JP)

( * ) Notice: Subject to any disclaimer, the term of this patent is extended or adjusted under 35 U.S.C. 154(b) by 399 days.

(21) Appl. No.: 18/161,157

(22) Filed: Jan. 30, 2023

(65) Prior Publication Data

US 2023/0306095 A1 Sep. 28, 2023

(30) Foreign Application Priority Data

Mar. 22, 2022 (JP) ................................. 2022-045811

(51) Int. Cl.
*G06F 21/32* (2013.01)
*H04R 1/10* (2026.01)

(52) U.S. Cl.
CPC ........... *G06F 21/32* (2013.01); *H04R 1/1041* (2013.01); *H04R 2420/07* (2013.01)

(58) Field of Classification Search
CPC .... G06F 21/32; H04R 1/1041; H04R 2420/07
USPC .......................................................... 726/18
See application file for complete search history.

(56) References Cited

U.S. PATENT DOCUMENTS

| | | | | |
|---|---|---|---|---|
| 6,496,107 B1 * | 12/2002 | Himmelstein | ......... | G07C 9/257 |
| | | | | 726/19 |
| 8,190,324 B2 * | 5/2012 | Hattori | ............... | G07C 9/00309 |
| | | | | 701/472 |
| 8,625,796 B1 * | 1/2014 | Ben Ayed | ............. | H04W 12/64 |
| | | | | 380/258 |
| 9,809,196 B1 * | 11/2017 | Penilla | .................... | B60R 25/10 |
| 10,665,244 B1 * | 5/2020 | Gupta | ................. | H04M 3/5166 |
| 10,846,960 B1 * | 11/2020 | Lemberger | ............. | G06V 20/63 |
| 11,361,060 B1 * | 6/2022 | Lyman | ................ | H04L 12/2829 |
| 11,422,568 B1 * | 8/2022 | Thomas | ................. | G05D 1/0274 |
| 11,443,750 B2 * | 9/2022 | Cho | ........................ | G10L 15/02 |
| 11,501,028 B2 * | 11/2022 | Kurosawa | ........... | G06F 21/6245 |
| 12,052,357 B2 * | 7/2024 | Yang | .................... | H04L 9/3271 |

(Continued)

FOREIGN PATENT DOCUMENTS

| | | |
|---|---|---|
| JP | 2008-33438 A | 2/2008 |
| JP | 2017-115439 A | 6/2017 |
| WO | WO 2018/198310 A1 | 11/2018 |

*Primary Examiner* — Noura Zoubair
*Assistant Examiner* — Mahabub S Ahmed
(74) *Attorney, Agent, or Firm* — Oblon, McClelland, Maier & Neustadt, L.L.P.

(57) ABSTRACT

An information processing device controlling a target. The information processing device included: a memory; and a processor coupled to the memory. The processor is configured to: measure a distance between the information processing device and the target; based on the distance, perform control to selectively implement: biometric authentication processing of a user of the target with audible range sound, or biometric authentication processing of the user with inaudible range sound; and control the target based on a result of the biometric authentication processing.

14 Claims, 12 Drawing Sheets

(56) References Cited

U.S. PATENT DOCUMENTS

| | | | | |
|---|---|---|---|---|
| 12,189,453 | B2* | 1/2025 | Arakawa | G06F 21/32 |
| 2002/0152010 | A1* | 10/2002 | Colmenarez | B60R 25/2045 |
| | | | | 340/426.1 |
| 2003/0122652 | A1* | 7/2003 | Himmelstein | G07C 9/257 |
| | | | | 340/5.84 |
| 2005/0001028 | A1* | 1/2005 | Zuili | G07F 7/1008 |
| | | | | 235/382 |
| 2011/0210821 | A1* | 9/2011 | Gehin | G07C 9/00309 |
| | | | | 340/5.64 |
| 2012/0254948 | A1* | 10/2012 | Kleve | H04L 9/3215 |
| | | | | 726/4 |
| 2012/0297467 | A1* | 11/2012 | Carper | H04L 9/3226 |
| | | | | 726/7 |
| 2013/0312071 | A1* | 11/2013 | Raman | G06F 21/32 |
| | | | | 726/6 |
| 2014/0136414 | A1* | 5/2014 | Abhyanker | G06Q 20/3224 |
| | | | | 701/25 |
| 2014/0152422 | A1* | 6/2014 | Breed | B60R 25/08 |
| | | | | 340/5.52 |
| 2014/0180914 | A1* | 6/2014 | Abhyanker | G06Q 10/0832 |
| | | | | 705/332 |
| 2014/0266658 | A1* | 9/2014 | Feldman | B60Q 5/005 |
| | | | | 340/438 |
| 2015/0203125 | A1* | 7/2015 | Penilla | G07C 5/0808 |
| | | | | 701/1 |
| 2015/0210287 | A1* | 7/2015 | Penilla | B60N 2/0024 |
| | | | | 701/49 |
| 2015/0220715 | A1* | 8/2015 | Kim | G06F 3/16 |
| | | | | 726/18 |
| 2015/0363986 | A1* | 12/2015 | Hoyos | H04W 12/08 |
| | | | | 340/5.61 |
| 2016/0313892 | A1* | 10/2016 | Roos | G06T 19/003 |
| 2016/0337863 | A1* | 11/2016 | Robinson | H04W 4/021 |
| 2017/0086072 | A1* | 3/2017 | Mao | H04L 63/0853 |
| 2017/0245106 | A1* | 8/2017 | Connelly | H04W 72/51 |
| 2017/0302659 | A1* | 10/2017 | Shteingart | H04W 12/08 |
| 2018/0091930 | A1* | 3/2018 | Jefferies | G07C 9/00571 |
| 2018/0096546 | A1* | 4/2018 | Bartels | G07C 9/29 |
| 2018/0201226 | A1* | 7/2018 | Falkson | B60R 25/257 |
| 2018/0307955 | A1* | 10/2018 | Sakuma | G06F 21/608 |
| 2018/0367656 | A1* | 12/2018 | Kim | G06V 40/161 |
| 2019/0054898 | A1* | 2/2019 | Okada | B60R 25/31 |
| 2019/0092281 | A1* | 3/2019 | Okada | G07C 9/00563 |
| 2019/0095653 | A1* | 3/2019 | Kurosawa | G06F 21/32 |
| 2019/0189129 | A1* | 6/2019 | Arakawa | A61B 5/1171 |
| 2019/0220581 | A1* | 7/2019 | Li | G06N 20/00 |
| 2019/0242986 | A1* | 8/2019 | Saban | G01S 15/74 |
| 2019/0318744 | A1* | 10/2019 | Bromand | G10L 17/02 |
| 2019/0373096 | A1* | 12/2019 | Shim | G06F 3/03548 |
| 2019/0377898 | A1* | 12/2019 | Dunjic | H04L 65/1063 |
| 2020/0012474 | A1* | 1/2020 | Okada | G06F 3/167 |
| 2020/0074055 | A1* | 3/2020 | Lesso | G10L 17/10 |
| 2020/0184054 | A1* | 6/2020 | Storm | G06N 5/04 |
| 2020/0244452 | A1* | 7/2020 | Lacava | H04L 63/0861 |
| 2020/0294508 | A1* | 9/2020 | Kwasiborski | H04R 25/405 |
| 2020/0309930 | A1* | 10/2020 | Zhou | G06N 3/09 |
| 2020/0353894 | A1* | 11/2020 | Obaidi | G05D 1/021 |
| 2021/0103646 | A1* | 4/2021 | Koshinaka | H04R 3/00 |
| 2021/0207974 | A1* | 7/2021 | Zhou | G01C 21/206 |
| 2021/0304775 | A1* | 9/2021 | van den Berg | G06Q 20/40145 |
| 2022/0036914 | A1* | 2/2022 | Ebenezer | H04R 1/10 |
| 2022/0109561 | A1* | 4/2022 | Yang | B60R 25/24 |
| 2022/0156870 | A1* | 5/2022 | Jiang | B60R 21/12 |
| 2022/0269268 | A1* | 8/2022 | Lau | B60K 35/00 |
| 2022/0369034 | A1* | 11/2022 | Kumar | H04R 5/04 |
| 2022/0382846 | A1* | 12/2022 | Koshinaka | A61B 5/117 |
| 2022/0392453 | A1* | 12/2022 | Gupta | G10L 17/12 |
| 2023/0008680 | A1* | 1/2023 | Ito | G06F 21/32 |
| 2023/0029467 | A1* | 2/2023 | Gowda | B60R 25/305 |
| 2023/0032366 | A1* | 2/2023 | Lee | H04W 8/00 |
| 2023/0143028 | A1* | 5/2023 | Koshinaka | H04L 63/0861 |
| | | | | 726/19 |
| 2024/0038243 | A1* | 2/2024 | Okabe | H04R 1/1091 |
| 2024/0127371 | A1* | 4/2024 | Ibrahim | G06Q 50/06 |
| 2024/0134947 | A1* | 4/2024 | Chen | G06F 21/32 |

* cited by examiner

Figure 4:
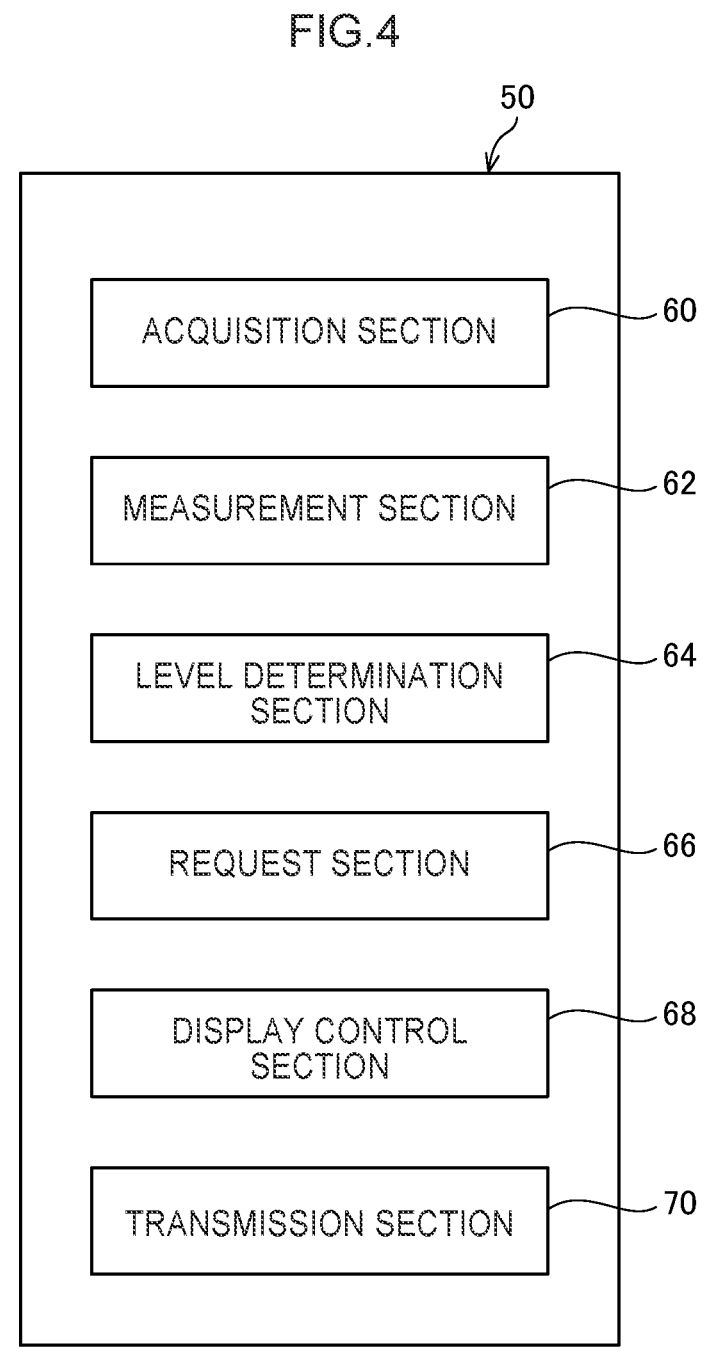

ACQUISITION SECTION — 60

MEASUREMENT SECTION — 62

LEVEL DETERMINATION SECTION — 64

REQUEST SECTION — 66

DISPLAY CONTROL SECTION — 68

TRANSMISSION SECTION — 70

80

REQUEST DETECTION SECTION — 100

SOUND PLAYBACK SECTION — 101

COMPARISON SECTION — 102

DETACHMENT DETECTION SECTION — 104

DETERMINATION SECTION — 106

RESULT TRANSMISSION SECTION — 108

Figure 8:
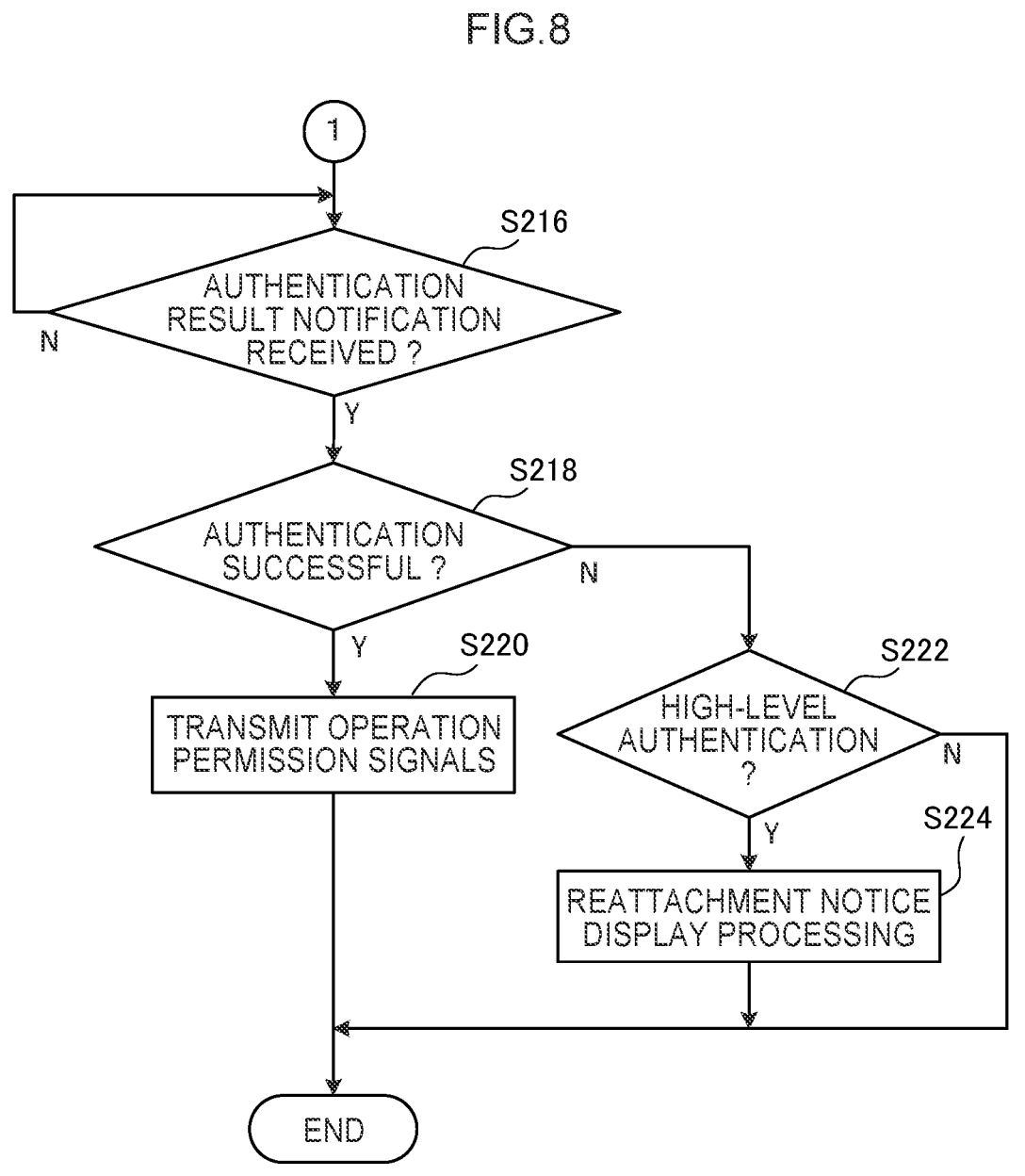

AUTHENTICATION
RESULT NOTIFICATION
RECEIVED ?

N

Y

S218

AUTHENTICATION
SUCCESSFUL ?

N

Y

S220

TRANSMIT OPERATION
PERMISSION SIGNALS

S222

HIGH-LEVEL
AUTHENTICATION
?

N

Y

S224

REATTACHMENT NOTICE
DISPLAY PROCESSING

END

Figure 12:
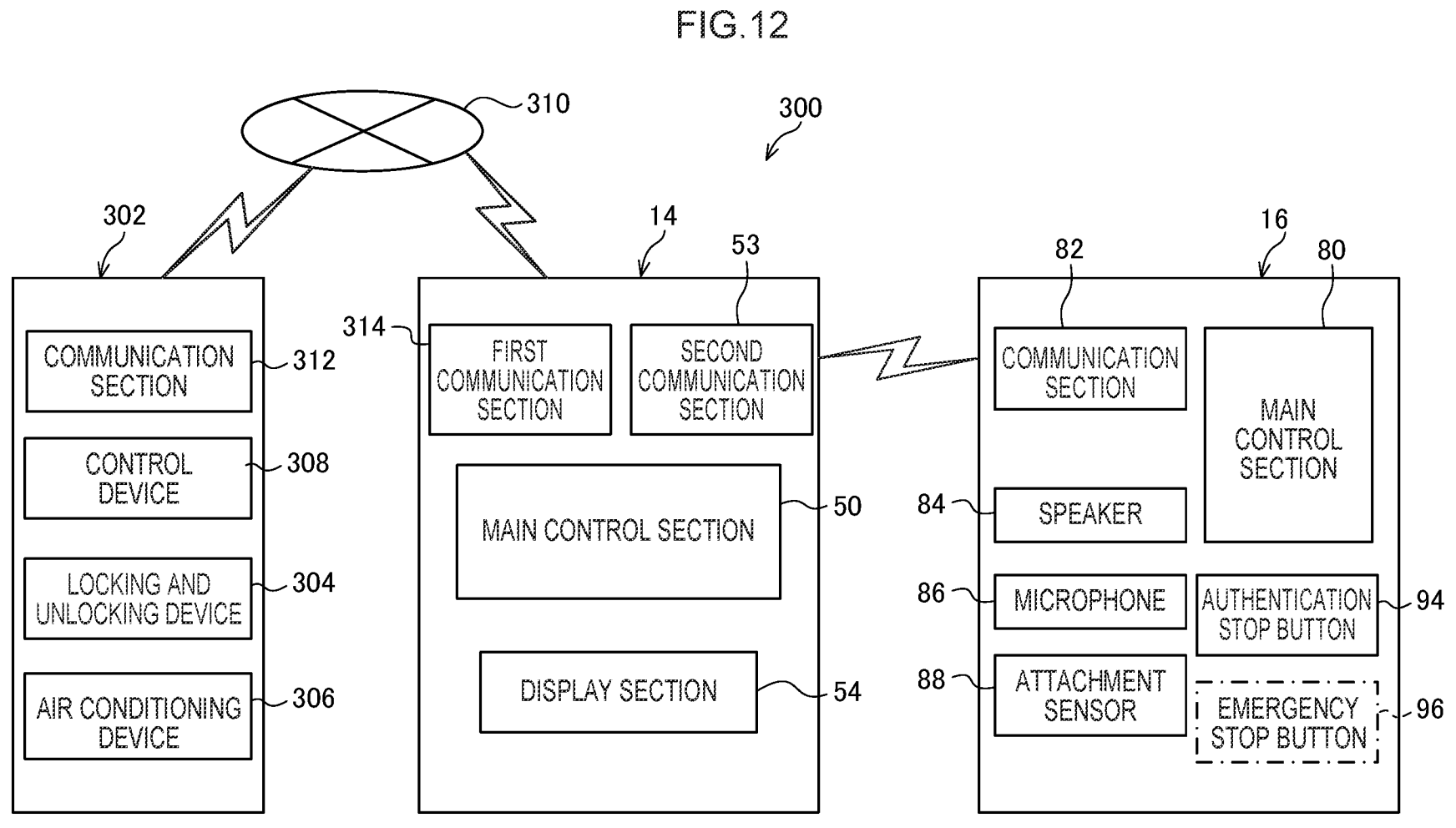

80 MAIN CONTROL SECTION

82 COMMUNICATION SECTION

84 SPEAKER

86 MICROPHONE

88 ATTACHMENT SENSOR

94 AUTHENTICATION STOP BUTTON

96 EMERGENCY STOP BUTTON

14

53 SECOND COMMUNICATION SECTION

314 FIRST COMMUNICATION SECTION

50 MAIN CONTROL SECTION

54 DISPLAY SECTION

310

302

312 COMMUNICATION SECTION

308 CONTROL DEVICE

304 LOCKING AND UNLOCKING DEVICE

306 AIR CONDITIONING DEVICE

INFORMATION PROCESSING DEVICE, AND INFORMATION PROCESSING METHOD

CROSS-REFERENCE TO RELATED APPLICATION

This application is based on and claims priority under 35 USC 119 from Japanese Patent Application No. 2022-045811 filed on Mar. 22, 2022, the disclosure of which is incorporated by reference herein.

BACKGROUND

Technical Field

The present disclosure relates to an information processing device, and an information processing method.

Related Art

A system has been developed that, in order to prevent operation of a target by a third party, performs biometric authentication at each time of operation.

For example, a proposal has been made (see Japanese Patent Application Laid-Open (JP-A) No. 2017-115439) to prevent unlocking of a doorlock of a vehicle (door unlocking) by a third party, by combining an operation by an electronic key (authentication) with biometric authentication of a user (for example, fingerprint authentication at a door handle).

As this biometric authentication, it is possible to carry out biometric authentication of a user (from the shape of an earhole) by outputting a sound into the earhole of the user from a device that is wearable at the ear of the user, acquiring echo sound and extracting a feature from the echo sound, and checking the feature against pre-registered characteristic quantities of legitimate users of the target.

If a sound for biometric authentication is in an audible range, the sound is heard by a user at each time of biometric authentication, which is annoying for the user. On the other hand, if the sound for biometric authentication is in an inaudible range, the user may be completely unaware of an operation relating to the target. That is, conducting biometric authentications by sound with either audible range sound or inaudible range sound is lacking in user-friendliness for users.

SUMMARY

An aspect of the present disclosure is an information processing device controlling a target, the information processing device including: a memory; and a processor coupled to the memory, the processor being configured to: measure a distance between the information processing device and the target; based on the distance, perform control to selectively implement: biometric authentication processing of a user of the target with audible range sound, or biometric authentication processing of the user with inaudible range sound; and control the target based on a result of the biometric authentication processing.

BRIEF DESCRIPTION OF DRAWINGS

FIG. 4 is a block diagram showing functional structures of a main control section of a smartphone according to the first exemplary embodiment.

FIG. 8 is a flowchart showing the example of the flow of processing at the main control section of the smartphone according to the first exemplary embodiment.

FIG. 12 is a schematic diagram showing overall structure of an information processing system according to a third exemplary embodiment.

DETAILED DESCRIPTION

Exemplary Embodiment

An information processing system including a vehicle according to a first exemplary embodiment is described.

Figure 1:
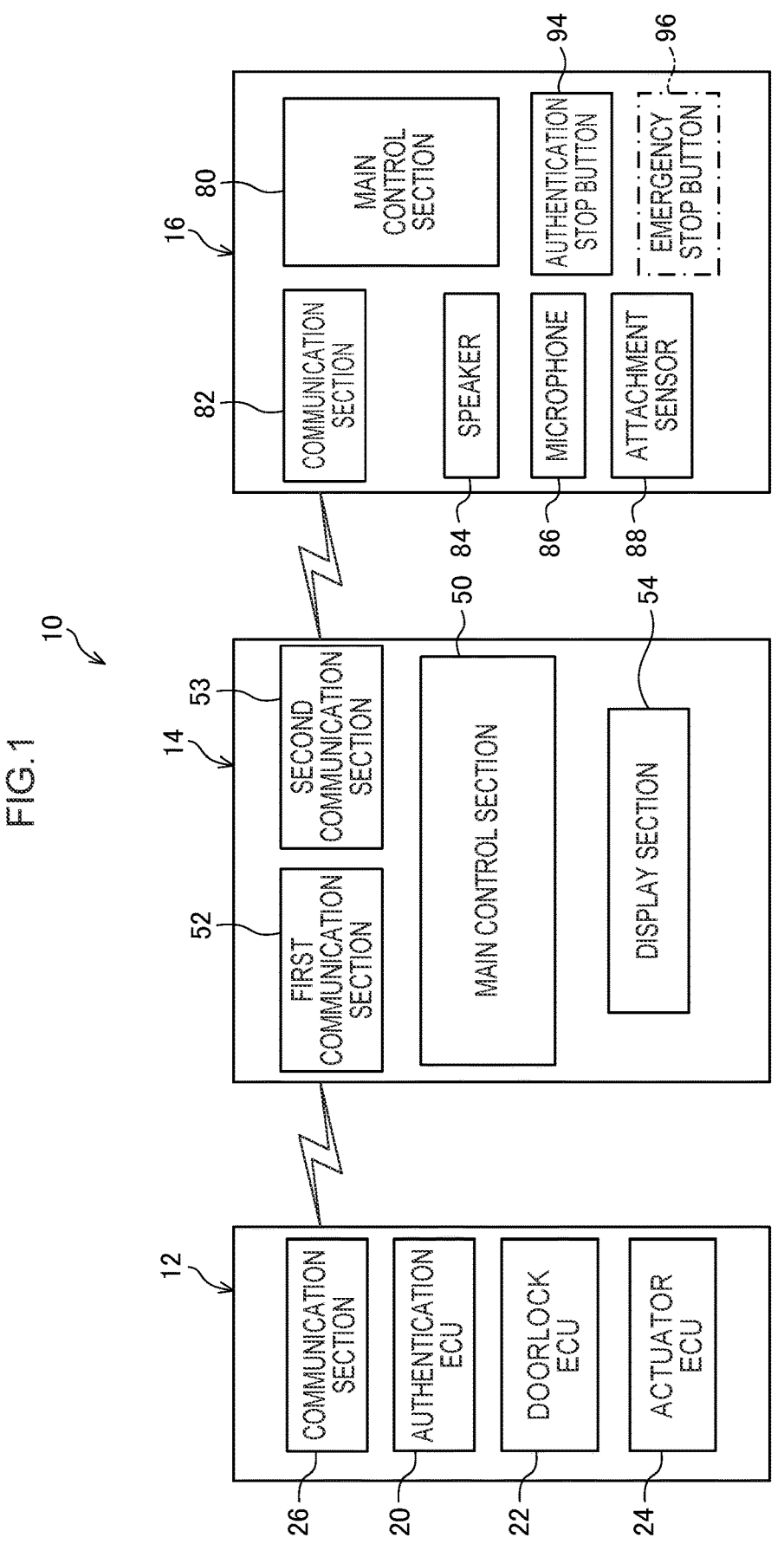
FIG. 1 is a schematic diagram showing overall structure of an information processing system according to a first exemplary embodiment.

As shown in FIG. 1, an information processing system 10 includes a vehicle 12, a smartphone 14, which is a portable terminal, and a hearable device 16. The meaning of the term "hearable device" as used herein is intended to include a type of wearable device that is specialized for sound output.

The vehicle 12 is equivalent to a "target", the smartphone 14 is equivalent to an "information processing device", and the hearable device 16 is equivalent to an "authorizer".

—Vehicle—

As shown in FIG. 1, the vehicle 12 includes an authentication ECU 20, a doorlock ECU 22, an actuator ECU 24 and a communication section 26.

When the authentication ECU 20 detects an operation relating to the vehicle 12, the authentication ECU 20 sends an authentication request to the smartphone 14. When operation permission signals resulting from the authentication request are inputted from the smartphone 14, the authentication ECU 20 performs control of the vehicle 12 in accordance with the operation by outputting operation permission signals to a corresponding ECU. For example, actuators are driven.

The meaning of the term "operation" as used herein is intended to include operations of operation switches and the like provided at the vehicle 12, inputs of operation signals to the vehicle 12 from outside the vehicle 12, and so forth. For example, an operation may be an input to the vehicle 12 of door unlocking operation signals from an electronic key of the vehicle 12.

The doorlock ECU 22 receives door unlocking signals and door locking signals, which are types of operation signals, from the electronic key, and when operation permission signals are inputted from the authentication ECU 20, the doorlock ECU 22 outputs driving signals to actuators of doorlock mechanisms to cause unlocking of doors (door unlocking) or locking of doors (door locking).

The actuator ECU 24 collectively represents ECUs of other driving systems including, for example, an engine ECU and so forth. When operation signals are inputted to the actuator ECU 24, driving (control) of actuators is conditional on the input of operation permission signals from the authentication ECU 20.

The communication section 26 is capable of transmitting and receiving Bluetooth (registered trademark) signals to and from a first communication section 52, which is described below, of the smartphone 14, which is carried by a (legitimate, approved) user of the vehicle 12.

Figure 2:
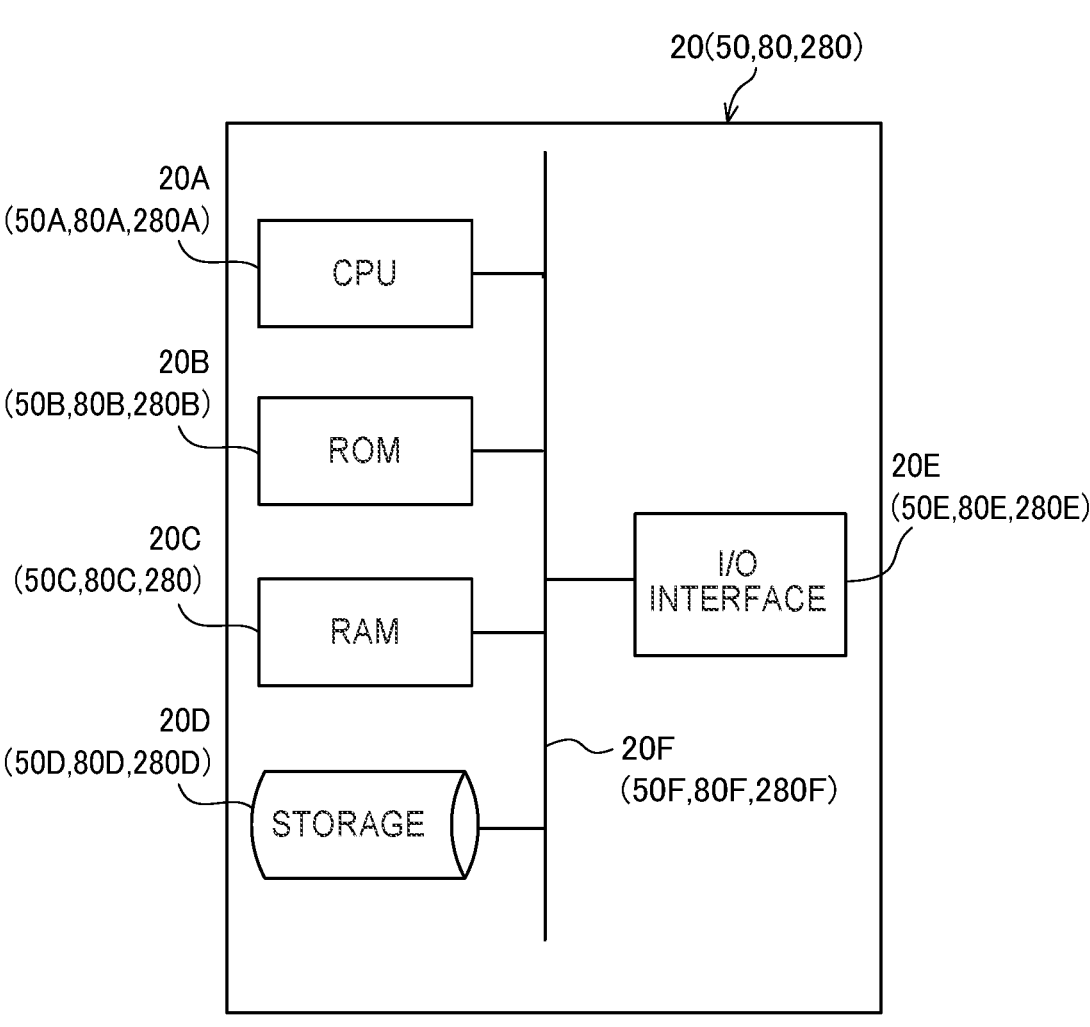
FIG. 2 is a block diagram showing hardware structures of an authentication ECU of a vehicle according to the first exemplary embodiment.

Now, hardware structures of the authentication ECU 20 are described with reference to FIG. 2.

The authentication ECU 20 includes a central processing unit (CPU; a hardware processor) 20A, read-only memory (ROM) 20B, which is an example of memory, random access memory (RAM) 20C, storage 20D and an input/output interface (I/O interface) 20E. These structures are connected to be capable of communicating with one another via a bus 20F.

The CPU 20A is a central arithmetic processing unit that loads various programs, executes processing in accordance with the programs, and controls various sections. That is, the CPU 20A reads a program from the ROM 20B or the storage 20D and executes the program, using the RAM 20C as a work area. The CPU 20A performs control of the structures described above and various kinds of computational processing in accordance with programs recorded in the ROM 20B or storage 20D.

The ROM 20B stores various programs and various kinds of data. The RAM 20C serves as a work area and memorizes programs and data.

The storage 20D is structured by a hard disk drive (HDD) or solid state drive (SSD). The storage 20D stores various programs, including an operating system, and various kinds of data. A program is stored in the storage 20D according to the present exemplary embodiment. This program may be stored in the ROM 20B.

The input/output interface (below, "the I/O interface") 20E is an interface for communications with other equipment. More specifically, the authentication ECU 20 is connected with the doorlock ECU 22, the actuator ECU 24 and the communication section 26 via the I/O interface 20E and an in-vehicle bus.

Now, functional structures of the authentication ECU 20 are described with reference to FIG. 3.

Figure 3:
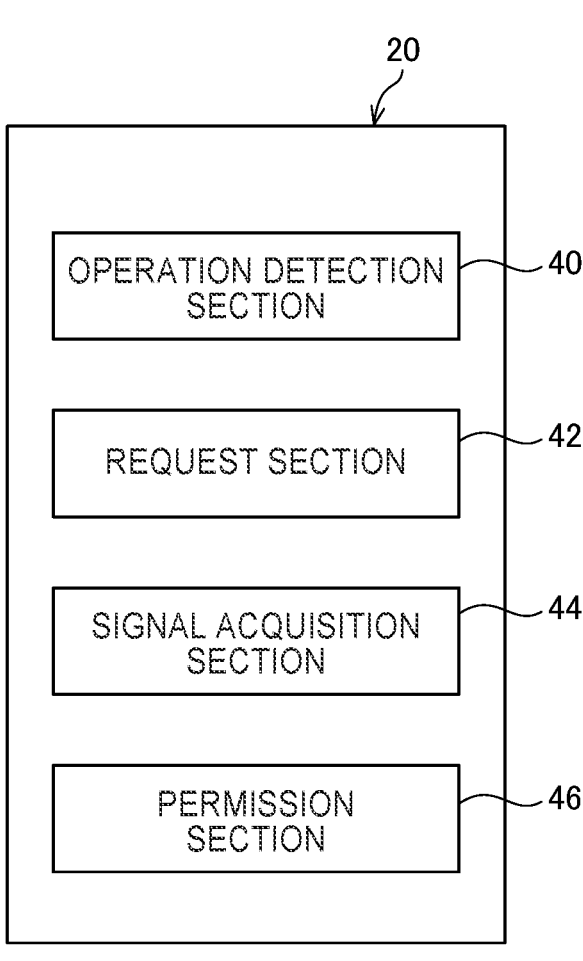
FIG. 3 is a block diagram showing functional structures of the authentication ECU according to the first exemplary embodiment.

As shown in FIG. 3, the authentication ECU 20 includes an operation detection section 40, a request section 42, a signal acquisition section 44, and a permission section 46.

The operation detection section 40 detects operation signals inputted to the vehicle 12 from outside the vehicle 12 and operation signals caused by operations of switches provided in the vehicle 12. In other words, the operation detection section 40 detects operations relating to the vehicle 12.

When the operation detection section 40 detects an operation relating to the vehicle 12, the request section 42 transmits authentication request signals to the smartphone 14 via the communication section 26, and transmits information about substance of the operation of the vehicle 12 ("operation substance information" below) to the smartphone 14 via the communication section 26.

When authentication at the smartphone 14 (more specifically, at the hearable device 16) is successful, the signal acquisition section 44 acquires operation permission signals that are transmitted from the smartphone 14 to the vehicle 12.

When the operation permission signals are acquired by the signal acquisition section 44, the permission section 46 outputs operation permission signals to an ECU controlling a target of operation, for example, the doorlock ECU 22. Hence, the doorlock ECU 22 drives (controls) actuators of doorlock mechanisms that are the target of operation.

—Smartphone—

Now the smartphone 14 is described.

As shown in FIG. 1, the smartphone 14 includes a main control section 50, the first communication section 52, a second communication section 53 and a display section 54.

In accordance with an authentication request from the vehicle 12, the main control section 50 measures a distance between the vehicle 12 and the smartphone 14, and the main control section 50 determines a notification level on the basis of substance of an operation relating the vehicle 12 and the measured distance. According to a result of this determination, the main control section 50 transmits high-level or low-level authentication request signals to the hearable device 16.

The first communication section 52 is capable of transmitting and receiving Bluetooth (registered trademark) signals to and from the communication section 26 of the vehicle 12.

The second communication section 53 is capable of transmitting and receiving Bluetooth (registered trademark) signals to and from a communication section 82, which is described below, of the hearable device 16.

The display section 54 is a monitor screen of the smartphone 14 and is capable of displaying an event display, which is described below, a user operation guidance display, a reattachment notice display, and so forth.

Now, hardware structures of the main control section 50 are described. The hardware structures of the main control section 50 are similar to the hardware structures of the authentication ECU 20. Therefore, the reference symbols in FIG. 2 are assigned to a CPU 50A to a bus 50F, and detailed descriptions thereof are not given here.

Now, functional structures of the main control section 50 are described with reference to FIG. 4.

The main control section 50 includes an acquisition section 60, a measurement section 62, a level determination section 64, a request section 66, a display control section 68 and a transmission section 70.

When the acquisition section 60 receives authentication request signals from the vehicle 12, the acquisition section 60 acquires operation substance information relating to the vehicle 12.

When the measurement section 62 receives the authentication request signals from the vehicle 12, the measurement section 62 measures (estimates) a distance between the smartphone 14 and the vehicle 12. For example, Bluetooth Low Energy (registered trademark) electromagnetic waves transmitted from the communication section 26 of the vehicle 12 are detected by the first communication section 52 of the smartphone 14, and the measurement section 62 measures (estimates) the distance between the smartphone 14 and the vehicle 12 on the basis of strength of the electromagnetic waves.

As an alternative example of electromagnetic waves, ultra-wide band (UWB) wireless communications or the like can be considered.

Further, if the smartphone 14 acquires position information of the vehicle 12, the distance between the vehicle 12 and the smartphone 14 may be measured (calculated) on the basis of position information acquired from a global positioning system (GPS).

On the basis of the operation substance information acquired by the acquisition section 60 and the distance between the smartphone 14 and vehicle 12 measured by the measurement section 62, the level determination section 64 determines the notification level of authentication request signals to be notified to the hearable device 16. More specifically, when (the substance of) the operation relating to the vehicle 12 is a security unlocking operation of the vehicle 12 and the distance between the smartphone 14 and the vehicle 12 is at least a predetermined distance (a threshold), the level determination section 64 determines the notification level to be the high level. Otherwise, the level determination section 64 determines the notification level to be the low level.

The meaning of the term "security unlocking operation" as used herein is intended to include an operation with a risk of theft of all or part of the vehicle 12 or of intrusion into the interior of the vehicle 12 (an operation associated with theft of valuables in a vehicle cabin).

For example, a door unlocking operation that enables ingress into the cabin of the vehicle 12 and an engine start operation that enables movement of the vehicle 12 are equivalent to the security unlocking operation.

Examples of operations that are not equivalent to the security unlocking operation include audio equipment operations and air conditioning operations relating to vehicle 12.

On the basis of a result of the notification level determination at the level determination section 64, the request section 66 transmits the high-level authentication request signals or low-level authentication request signals from the second communication section 53 to the hearable device 16.

When the request section 66 transmits the high-level authentication request signals to the hearable device 16, the display control section 68 displays the event display and user operation guidance display at the display section 54. Hence, if authentication failure signals from the hearable device 16 are received at the smartphone 14, the display control section 68 displays the reattachment notice display at the display section 54.

When authentication at the hearable device 16 is successful (authentication success signals are received from the hearable device 16), the transmission section 70 transmits operation permission signals to the vehicle 12.

—Hearable Device—

Now, the hearable device 16 is described.

As shown in FIG. 1, the hearable device 16 includes a main control section 80, the communication section 82, a speaker 84, a microphone 86, an attachment sensor 88 and an authentication stop button 94.

The hearable device 16 is a wearable device specialized for sound output that is worn at (attachable to) an ear of a user. When the hearable device 16 is attached to a user, the speaker 84 and microphone 86 are disposed to be oriented towards the earhole of the user.

In accordance with the authentication request signals from the smartphone 14, the main control section 80 uses sound to carry out biometric authentication of the user (otoacoustic authentication). When a high-level authentication is requested, the main control section 80 carries out the biometric authentication of the user by causing the speaker 84 that is oriented toward the earhole of the user wearing the hearable device 16 to output audible range sound, acquiring echo sound with the microphone 86, extracting a feature from the echo sound, and checking the feature against pre-registered characteristic quantities of legitimate users.

Alternatively, when a low-level authentication is requested, the main control section 80 carries out the biometric authentication of the user by causing the speaker 84 to output inaudible range sound, acquiring echo sound with the microphone 86, extracting the feature from the echo sound, and checking the feature against the pre-registered characteristic quantities of legitimate users.

The communication section 82 is capable of transmitting and receiving Bluetooth (registered trademark) signals to and from the second communication section 53 of the smartphone 14.

The attachment sensor 88 is a sensor that detects whether or not the hearable device 16 is attached to the ear of the user.

The authentication stop button 94 is a button that, when pressed, stops biometric authentication at the hearable device 16. When biometric authentication by the hearable device 16 has been stopped, the hearable device 16 automatically outputs authentication failure signals when authentication is requested. That is, implementation of all operations relating to the vehicle 12 is stopped. Instead of biometric authentication being stopped by the authentication stop button 94, biometric authentication may be stopped by the user saying "stop authentication" or the like into the microphone 86.

Now, hardware structures of the main control section 80 are described. The hardware structures of the main control section 50 are similar to the authentication ECU 20. Therefore, the reference symbols in FIG. 2 are assigned to a CPU 80A to a bus 80F, and detailed descriptions thereof are not given here.

The storage 80D stores audible range and inaudible range sound data to be used for otoacoustic authentication by the hearable device 16, and sound data of an authentication starting message that is given when the otoacoustic authentication is to be conducted with the audible range sound. The storage 80D also stores data of the characteristic quantities of (legitimate) users of the vehicle 12 for checking against at a time of otoacoustic authentication (biometric authentication).

A configuration is possible in which this sound data and the like are stored at the storage 50D of the main control section 50 of the smartphone 14 and transmitted to the hearable device 16 at predetermined times.

Now, functional structures of the main control section 80 are described with reference to FIG. 5.

Figure 5:
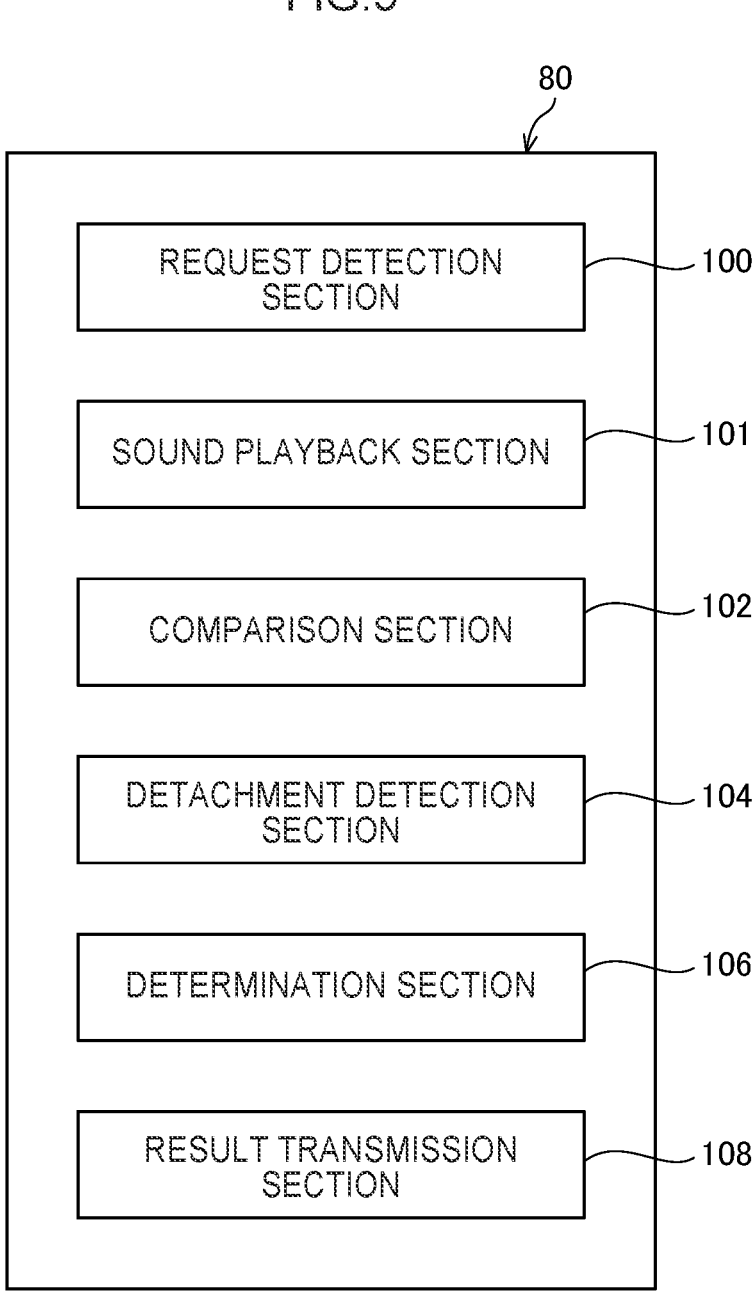
FIG. 5 is a block diagram showing functional structures of a main control section of a hearable device according to the first exemplary embodiment.

As shown in FIG. 5, the main control section 80 includes a request detection section 100, a sound playback section 101, a comparison section 102, a detachment detection section 104, a determination section 106 and a result transmission section 108.

When the request detection section 100 receives the authentication request signals transmitted from the smartphone 14, the request detection section 100 determines whether the level is to be high (high-level authentication request signals) or low (low-level authentication request signals).

When the sound playback section 101 receives the high-level authentication request signals from the smartphone 14, the sound playback section 101 plays authentication starting sound data read from the storage 80D and outputs the authentication starting message through the speaker 84 as audible range sound. Then, the sound playback section 101 plays audible authentication sound data read from the storage 80D and outputs the audible range sound for otoacoustic authentication through the speaker 84. If the sound playback section 101 was playing sound before the start of otoacoustic authentication, the sound playback section 101 pauses or mutes that sound (for example, music) at the time of starting the otoacoustic authentication.

When the sound playback section 101 receives the low-level authentication request signals from the smartphone 14, the sound playback section 101 plays inaudible authentication sound data read from the storage 80D and outputs the inaudible range sound for otoacoustic authentication through the speaker 84. If the sound playback section 101 was playing sound (for example, music) before the start of otoacoustic authentication, the sound playback section 101 continues playing that sound (for example, music).

The sound playback section 101 is capable of playing sound data (music or the like) transmitted from the smartphone 14 at times other than otoacoustic authentication with the audible range sound. That is, the hearable device 16 may function as a wireless earphone for the smartphone 14.

When the audible range sound or inaudible range sound for otoacoustic authentication is selectively outputted from the speaker 84, the comparison section 102 acquires echo sound with the microphone 86 and extracts the feature from the echo sound.

The comparison section 102 then compares the extracted feature with characteristic quantities of legitimate users stored (pre-registered) in the storage 80D, and makes a determination as to whether the user wearing the hearable device 16 is a legitimate user of the vehicle 12. In other words, the comparison section 102 carries out otoacoustic authentication (biometric authentication) of the user.

When the notification level is high (high-level authentication request signals have been received), on the basis of detection signals from the attachment sensor 88, the detachment detection section 104 makes a determination as to whether the hearable device 16 is detached from the user while the audible range sound for otoacoustic authentication is being outputted from the speaker 84.

When the notification level is high, if the otoacoustic authentication (biometric authentication) by the comparison section 102 is successful and no detachment of the hearable device 16 during the otoacoustic authentication is detected by the detachment detection section 104, then the determination section 106 determines that the authentication is a success. On the other hand, if the biometric authentication of the comparison section 102 is unsuccessful or detachment of the hearable device 16 during the otoacoustic authentication is detected by the detachment detection section 104, then the determination section 106 determines that the authentication is a failure.

When the notification level is low, if the otoacoustic authentication (biometric authentication) by the comparison section 102 is successful, then the determination section 106 determines that the authentication is a success, and if the biometric authentication of the comparison section 102 is unsuccessful, then the determination section 106 determines that the authentication is a failure.

In accordance with the determination result at the determination section 106, the result transmission section 108 transmits authentication success signals or authentication failure signals to the smartphone 14.

Operation

Now, authentication processing in the information processing system 10 is described with reference to the flowcharts shown in FIG. 6 to FIG. 9. First, processing at (the authentication ECU 20 of) the vehicle 12 is described. Then, processing at (the main control section 50 of) the smartphone 14 is described. Lastly, processing at (the main control section 80 of) the hearable device 16 is described.
—Processing at the Authentication ECU—

First, the processing at the authentication ECU 20 of the vehicle 12 is described with reference to the flowchart shown in FIG. 6.

Figure 6:
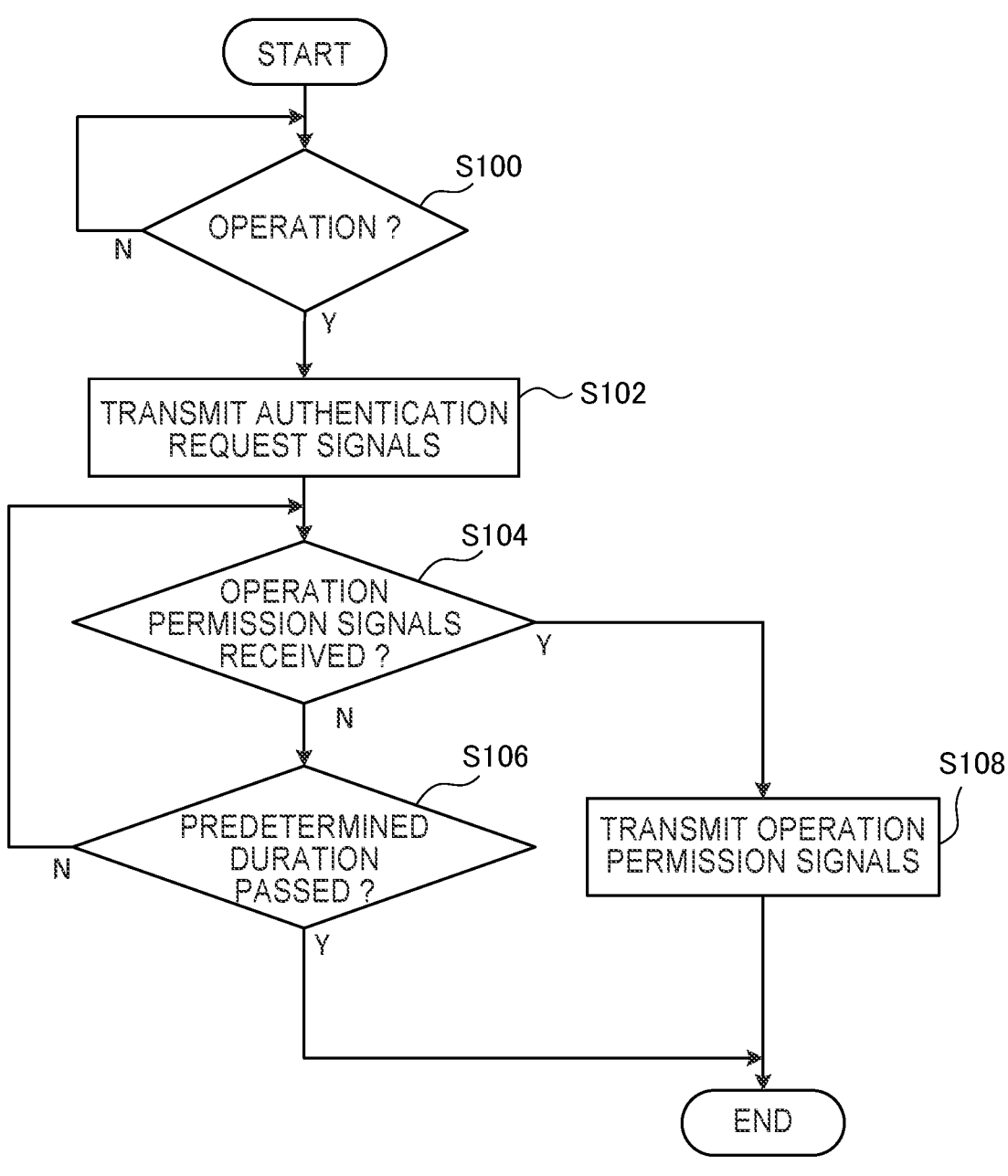
FIG. 6 is a flowchart showing an example of a flow of processing at the authentication ECU of the vehicle according to the first exemplary embodiment.

In step S100 of FIG. 6, the CPU 20A of the authentication ECU 20 makes a determination as to whether the vehicle 12 has been operated.

When the result of the determination in step S100 is negative, the CPU 20A stands by at step S100 until the vehicle 12 is operated. On the other hand, when the result of the determination in step S100 is affirmative, the CPU 20A proceeds to step S102.

In step S102, the CPU 20A of the authentication ECU 20 transmits authentication request signals to the smartphone 14 of a (legitimate) user via the communication section 26.

As is described below, when these authentication request signals are transmitted, authentication processing is carried out at the smartphone 14 and hearable device 16, and when the authentication is successful, operation permission signals are transmitted from the smartphone 14 to the vehicle 12.

In step S104, the CPU 20A of the authentication ECU 20 makes a determination as to whether the operation permission signals have been received from the smartphone 14.

When the result of the determination in step S104 is negative, the CPU 20A proceeds to step S106. When the result of the determination in step S104 is affirmative, the CPU 20A proceeds to step S108.

In step S106, the CPU 20A of the authentication ECU 20 makes a determination as to whether a predetermined duration has passed since the transmission of the authentication request signals in step S102.

When the result of the determination in step S106 is negative, that is, while the predetermined duration has not passed, the CPU 20A returns to step S104. Alternatively, when the predetermined duration has passed, the CPU 20A judges that an authentication failure has been determined at the smartphone 14 and hearable device 16, and ends this processing. That is, control of the vehicle 12 in accordance with operation signals transmitted to the vehicle 12 is refused (cancelled) and is not implemented.

Alternatively, in step S108, the CPU 20A of the authentication ECU 20 outputs operation permission signals to an ECU of actuators corresponding to the substance of the operation. As a result, the actuators are controlled and driven by the ECU (i.e., the operation is implemented). For example, when door unlocking operation signals are inputted, operation permission signals are inputted from the authentication ECU 20 to the doorlock ECU 22, actuators are controlled and driven, and door locks are unlocked (opened).

—Processing at the Main Control Section 50—

Now, the processing at the main control section 50 of the smartphone 14 is described with reference to FIG. 7 and FIG. 8.

Figure 7:
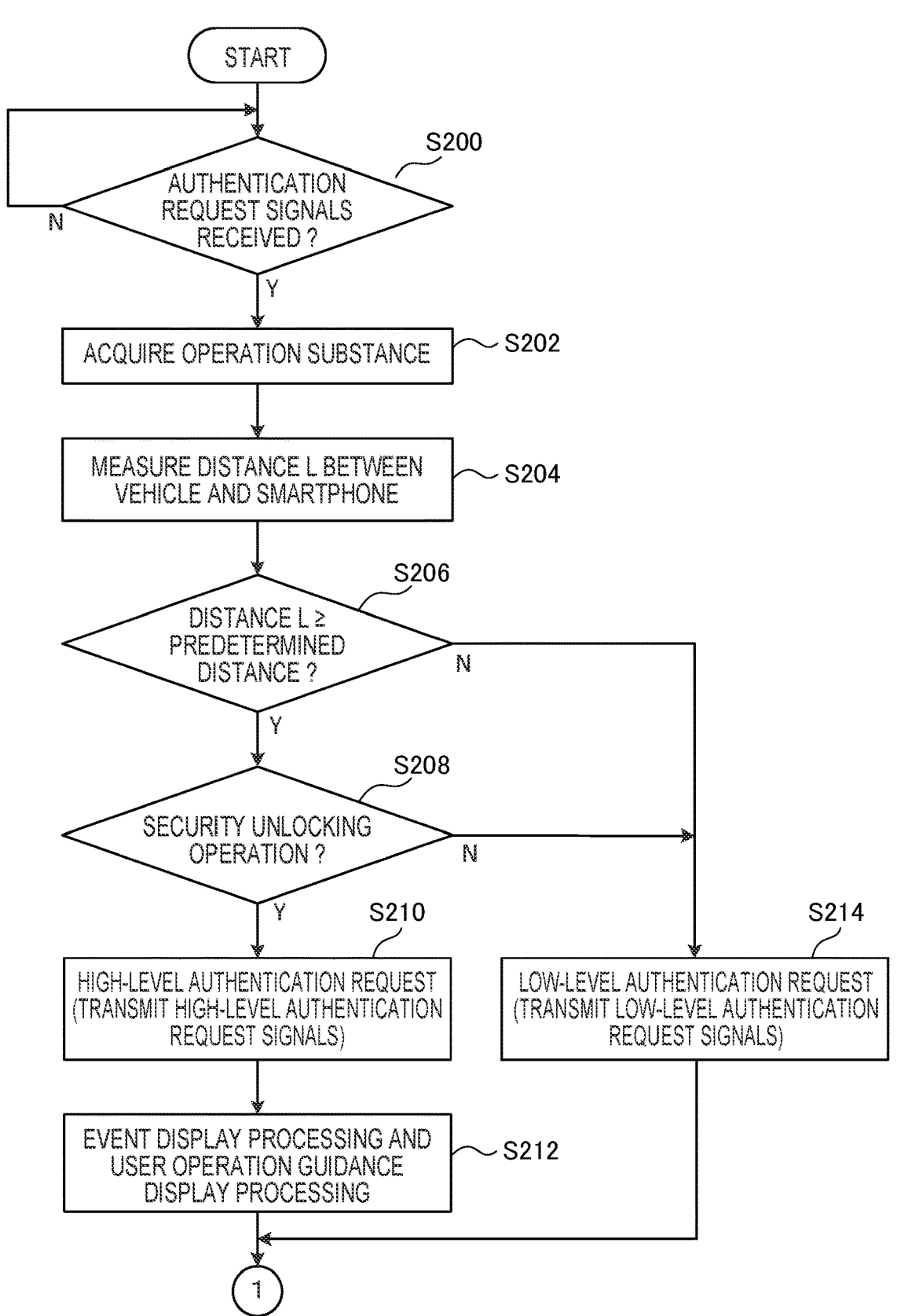
FIG. 7 is a flowchart showing an example of a flow of processing at the main control section of the smartphone according to the first exemplary embodiment.

First, in step S200 of FIG. 7, the CPU 50A of the main control section 50 makes a determination as to whether authentication request signals have been received from the vehicle 12.

When the result of the determination in step S200 is negative, the CPU 50A stands by at step S200 until the authentication request signals are received. On the other hand, when the result of the determination in step S200 is affirmative, the CPU 50A proceeds to step S202.

In step S202, the CPU 50A of the main control section 50 acquires operation substance information that is transmitted together with the authentication request signals.

Then, in step S204, the CPU 50A of the main control section 50 measures a distance L between the smartphone 14 and the vehicle 12. For example, the first communication section 52 of the smartphone 14 receives electromagnetic waves transmitted from the communication section 26 of the vehicle 12 and measures (estimates) the distance L between the smartphone 14 and the vehicle 12 on the basis of strength of the electromagnetic waves.

In step S206, the CPU 50A of the main control section 50 makes a determination as to whether the measured distance L is at least a predetermined distance that is a threshold value, for example, 10 m.

When the result of the determination in step S206 is affirmative, the CPU 50A proceeds to step S208, and when the result of the determination in step S206 is negative, the CPU 50A proceeds to step S214.

In step S208, the CPU 50A of the main control section 50 makes a determination as to whether the operation substance (information) is of a security unlocking operation.

When the result of the determination in step S208 is affirmative, the CPU 50A proceeds to step S210, and when the result of the determination in step S208 is negative, the CPU 50A proceeds to step S214.

In step S210, the CPU 50A of the main control section 50 transmits the high-level authentication request signals to the hearable device 16.

Then in step S212, the CPU 50A of the main control section 50 carries out event display processing and user operation guidance processing, that is, processing to display guidance at the display section 54 about a user operation for preventing implementation of an operation when the vehicle 12 is operated but a third party is performing that operation. For example, "The vehicle is being accessed. If you are not performing this operation, remove your hearable device." is displayed at the display section 54.

Alternatively, in step S214 the CPU 50A of the main control section 50 transmits the low-level authentication request signals to the hearable device 16.

When the processing of step S212 or step S214 is completed, the CPU 50A proceeds to step S216 in FIG. 8.

In step S216, the CPU 50A of the main control section 50 makes a determination as to whether an authentication result notification has been received from the hearable device 16.

When the result of the determination in step S216 is affirmative, the CPU 50A proceeds to step S218, and when the result of the determination in step S216 is negative, the CPU 50A stands by at step S216.

In step S218, the CPU 50A of the main control section 50 makes a determination as to whether the received authentication result is an authentication success (authentication success signals) or not (i.e., an authentication failure (authentication failure signals)).

When the result of the determination in step S218 is affirmative, the CPU 50A proceeds to step S220, and when the result of the determination in step S218 is negative, the CPU 50A proceeds to step S222.

In step S220, the CPU 50A of the main control section 50 transmits operation permission signals to the vehicle 12 (the authentication ECU 20).

Alternatively, in step S222, the CPU 50A of the main control section 50 makes a determination as to whether the authentication result is an authentication result in response to high-level authentication request signals or not (i.e., an authentication result in response to low-level authentication request signals).

When the result of the determination in step S222 is affirmative, the CPU 50A proceeds to step S224, and when the result of the determination in step S222 is negative, this processing ends.

In step S224, the CPU 50A of the main control section 50 carries out reattachment notice display processing. That is, the display section 54 displays a notice when the user is to reattach the hearable device 16. For example, "If you need to use the hearable device 16 now, deactivate authentication with the hearable device 16 (press the authentication stop button 94) before attaching the hearable device 16, or attach the hearable device 16 in a location where you can see the vehicle." is displayed at the display section 54.

—The Main Control Section 80—

Now, processing at the main control section 80 of the hearable device 16 is described with reference to FIG. 9.

Figure 9:
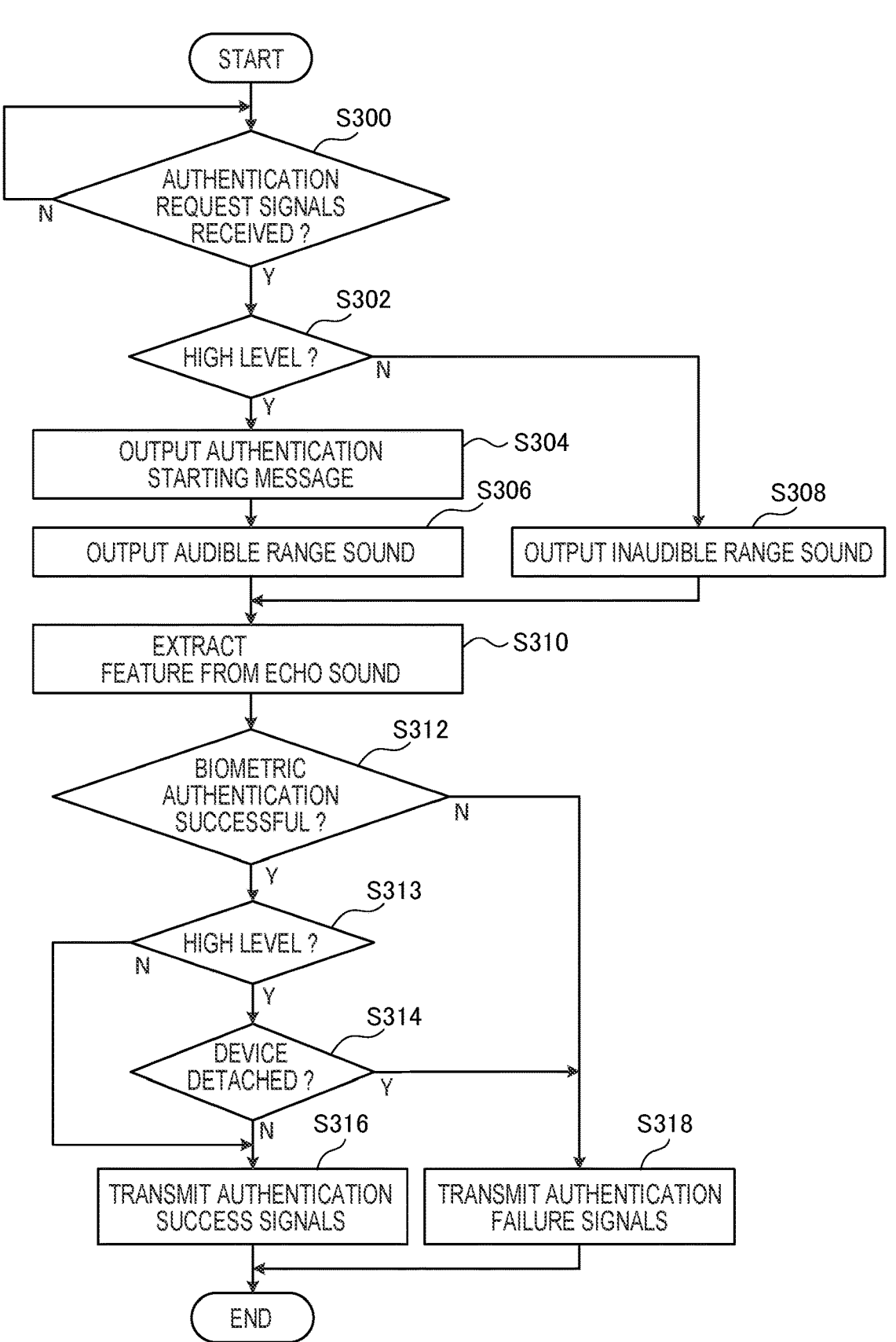
FIG. 9 is a flowchart showing an example of a flow of processing at the main control section of the hearable device according to the first exemplary embodiment.

First, in step S300 of FIG. 9, the CPU 80A of the main control section 80 makes a determination as to whether authentication request signals have been received from the smartphone 14.

When the result of the determination in step S300 is affirmative, the CPU 80A proceeds to step S302, and when the result of the determination in step S300 is negative, the CPU 80A stands by at step S300.

In step S302, the CPU 80A of the main control section 80 makes a determination as to whether the authentication request signals are at the high level (high-level authentication request signals) or not (i.e., low-level authentication request signals).

When the result of the determination in step S302 is affirmative (the high-level authentication request signals), the CPU 80A proceeds to step S304, and when the result of the determination in step S302 is negative (the low-level authentication request signals), the CPU 80A proceeds to step S308.

In step S304, the CPU 80A of the main control section 80 plays the authentication starting sound data read from the storage 80D and outputs the authentication starting message (that otoacoustic authentication (biometric authentication) is starting) from the speaker 84 as audible range sound. The authentication starting message is, for example, "Now starting otoacoustic authentication."

If another sound such as, for example, music or the like is being outputted from the speaker 84 of the hearable device 16 at this time, playback of the another sound is paused or muted.

Then, in step S306, the CPU 80A of the main control section 80 plays the audible authentication sound data read from the storage 80D and outputs the audible range sound for otoacoustic authentication from the speaker 84 to the earhole of the user wearing the hearable device 16.

Alternatively, when the result of the determination in step S302 is negative (the low-level authentication request signals), in step S308 the CPU 80A of the main control section 80 plays the inaudible authentication sound data read from the storage 80D and outputs the inaudible range sound for otoacoustic authentication from the speaker 84 to the earhole of the user wearing the hearable device 16.

Then, in step S310, the CPU 80A of the main control section 80 acquires echo sound from the earhole of the user wearing the hearable device 16 with the microphone 86, and extracts the feature from this echo sound.

In step S312, the CPU 80A of the main control section 80 makes a determination as to whether the user wearing the hearable device 16 is a legitimate user. That is the CPU 80A of the main control section 80 reads characteristic quantities of legitimate users stored in advance at the hearable device 16 from the storage 80D, compares the characteristic quantities with the feature extracted from the echo sound, and makes a determination as to whether the user wearing the hearable device 16 is a legitimate user (i.e., the CPU 80A implements biometric authentication).

When the result of the determination in step S312 is affirmative, the CPU 80A proceeds to step S313, and when the result of the determination in step S312 is negative, the CPU 80A proceeds to step S318.

In step S313, the CPU 80A of the main control section 80 makes a determination as to whether the result of the biometric authentication is a result of biometric authentication in response to high-level authentication request signals or not (i.e., an authentication result in response to low-level authentication request signals).

When the result of the determination in step S313 is affirmative, the CPU 80A proceeds to step S314, and when the result of the determination in step S313 is negative, the CPU 80A proceeds to step S316.

In step S314, the CPU 80A of the main control section 80 makes a determination as to whether the hearable device 16 has been detached from the user during the output from the speaker 84 of the audible range sound for biometric authentication. More specifically, the CPU 80A of the main control section 80 makes a determination as to whether the user has detached the hearable device 16 on the basis of detection signals from the attachment sensor 88.

When the result of the determination in step S314 is negative, the CPU 80A proceeds to step S316, and when the result of the determination in step S314 is affirmative, the CPU 80A proceeds to step S318.

When the result of the determination in step S313 is negative or the result of the determination in step S314 is negative, then in step S316 the CPU 80A of the main control section 80 transmits the authentication success signals to the smartphone 14 and ends this processing.

On the other hand, when the result of the determination in step S312 is negative or the result of the determination in step S314 is affirmative, then in step S318 the CPU 80A of the main control section 80 transmits the authentication failure signals to the smartphone 14 and ends this processing.

Effects

Thus, in the information processing system 10, when the vehicle 12 is operated (operation signals relating to the vehicle 12 are inputted), a user authentication request is made from the vehicle 12 to the hearable device 16 via the smartphone 14 of a (legitimate) user of the vehicle 12. Thus, biometric authentication may be performed accurately by otoacoustic authentication at the hearable device 16.

That is, when the user is not wearing the hearable device 16, when a third party is wearing the hearable device 16 or the like, operation of the vehicle 12 by a third party other than the user may be assuredly prevented.

When (a user carrying) the smartphone 14 is distant by at least the predetermined distance (threshold) from the vehicle 12 and an operation relating to the vehicle 12 is a security unlocking operation, because the otoacoustic authentication by the hearable device 16 is carried out with sound in an audible range (audible sound), the user may be made aware that an operation is being performed on the vehicle 12. As a result, a user who is distant from the vehicle 12 may confirm that the user themself is performing the operation relating to the vehicle 12. Alternatively, if the user is not performing the operation themself (the operation is from a third party), the user may take measures to prevent theft of the vehicle 12, may go to check the vehicle 12, or the like.

In particular, because an event (the fact that the vehicle 12 has been operated) is displayed at the display section 54 of the smartphone 14 carried by the user of the vehicle 12 at the time of starting the otoacoustic authentication, the user may be assuredly made aware of the operation.

When the operation relating to the vehicle 12 is not performed by the user, the user operation guidance is displayed at the display section 54 of the smartphone 14. Hence, the user may make the authentication at the hearable device 16 unsuccessful simply by performing an operation in accordance with the operation guidance, thus disabling operation of the vehicle 12 by a third party (i.e., the operation relating to the vehicle 12 is not implemented).

For example, if the user hears sound from the hearable device 16 while in a room at home (in a state in which the otoacoustic (biometric) authentication would be successful), even if door unlocking operation signals are inputted to the vehicle 12 by a relay attack by a third party, implementation of the door unlocking operation of the vehicle 12 may be assuredly prevented simply by the user detaching the hearable device 16 while hearing the audible range sound for otoacoustic authentication.

When (the user carrying) the smartphone 14 is located in a range of less than the predetermined distance L from the vehicle 12 or the operation relating to the vehicle 12 is not a security unlocking operation, otoacoustic authentication by the hearable device 16 is carried out with sound in an inaudible range (inaudible sound). Therefore, cases of the user hearing an authentication sound at each time of otoacoustic authentication and feeling annoyance may be suppressed.

That is, when the user of the vehicle 12 is located in the vicinity of the vehicle 12, there is a high probability that an operation is an operation by the user, and even if the operation is an operation by a third party, it is likely that the user located in the vicinity of the vehicle 12 can check (see) the state of the vehicle 12 and may prevent theft of the vehicle 12 or the like.

When an operation is not a security unlocking operation, even if authentication by the hearable device 16 is successful and operation of the vehicle 12 by a third party is implemented, it is likely that theft of the vehicle 12 or an intrusion into the cabin may be prevented.

Thus, in the information processing system 10, because biometric authentication is conducted with audible range sound only for the subset of operations with a high risk of theft of the vehicle 12 or the like, a user is made aware of these operations relating to the vehicle 12, and because the biometric authentication is performed with inaudible range sound for other operations, cases of a user hearing biometric authentication sound at each time of biometric authentication and feeling annoyance may be prevented. In other words, user-friendliness for users when biometric authentication is conducted by sound may be improved.

Moreover, in this information processing system 10, a reattachment notice is displayed at the display section 54 of the smartphone 14 when the otoacoustic authentication is implemented with the audible range sound by the hearable device 16 but the hearable device 16 is detached at this time (an operation relating to the vehicle 12 is not an operation by that user).

That is, a message is displayed at the display section 54 of the smartphone 14, requesting the user to attach the hearable device 16 after performing a step to stop otoacoustic authentication at the hearable device 16 (pressing the authentication stop button 94) or after the user wearing the hearable device 16 has moved to a position from which the vehicle 12 is visible.

If a user seeing this display stops otoacoustic authentication by pressing the authentication stop button 94, then even if the third party continues to carry out a security unlocking operation relating to the vehicle 12, repetition of the otoacoustic authentication with the audible range sound (interrupting music the user is listening to or the like) at the hearable device 16 that the user has reattached, causing annoyance to the user, is prevented. When the user has pressed the authentication stop button 94, authentication failure signals are automatically returned each time authentication is requested of the hearable device 16. Consequently, the operation relating to the vehicle 12 is not implemented.

Alternatively, when otoacoustic authentication is stopped by the hearable device 16, there is a high risk that the user may not be aware of repetition by the third party of the security unlocking operation relating to the vehicle 12. Therefore, the user is recommended to check the state of the vehicle 12 (check that there is no stranger (third party) in the vicinity of the vehicle 12) by moving to a location at which the user can see the vehicle 12 and then attaching the hearable device 16 (wearing the hearable device 16 and listening to music or the like).

In this description of the information processing system 10, the vehicle 12 and the smartphone 14 are capable of communicating by Bluetooth (registered trademark), which is short-range wireless communications. However, as in the third exemplary embodiment described below, (the user carrying) the smartphone 14 may conduct biometric authentication even when located a long distance from the vehicle 12, provided the vehicle 12 and smartphone 14 are capable of transmitting and receiving signals via a network.

In the present exemplary embodiment, when authentication failure signals are received from the hearable device 16, no signals are transmitted from the smartphone 14 to the vehicle 12 (only operation permission signals are transmitted (step S220 in FIG. 8)). However, operation prohibition signals may be transmitted to the vehicle 12 so as to actively prevent implementation of the operation relating to the vehicle 12.

Second Exemplary Embodiment

An information processing system 200 according to the second exemplary embodiment is described. Parts with the same functions as in the information processing system 10 according to the first exemplary embodiment are assigned the same reference symbols and detailed descriptions thereof are not given here. Parts whose functions are different to some extent from the information processing system 10 according to the first exemplary embodiment are assigned reference symbols that are 200 greater in number than the corresponding reference symbols in the first exemplary embodiment.

Figure 10:
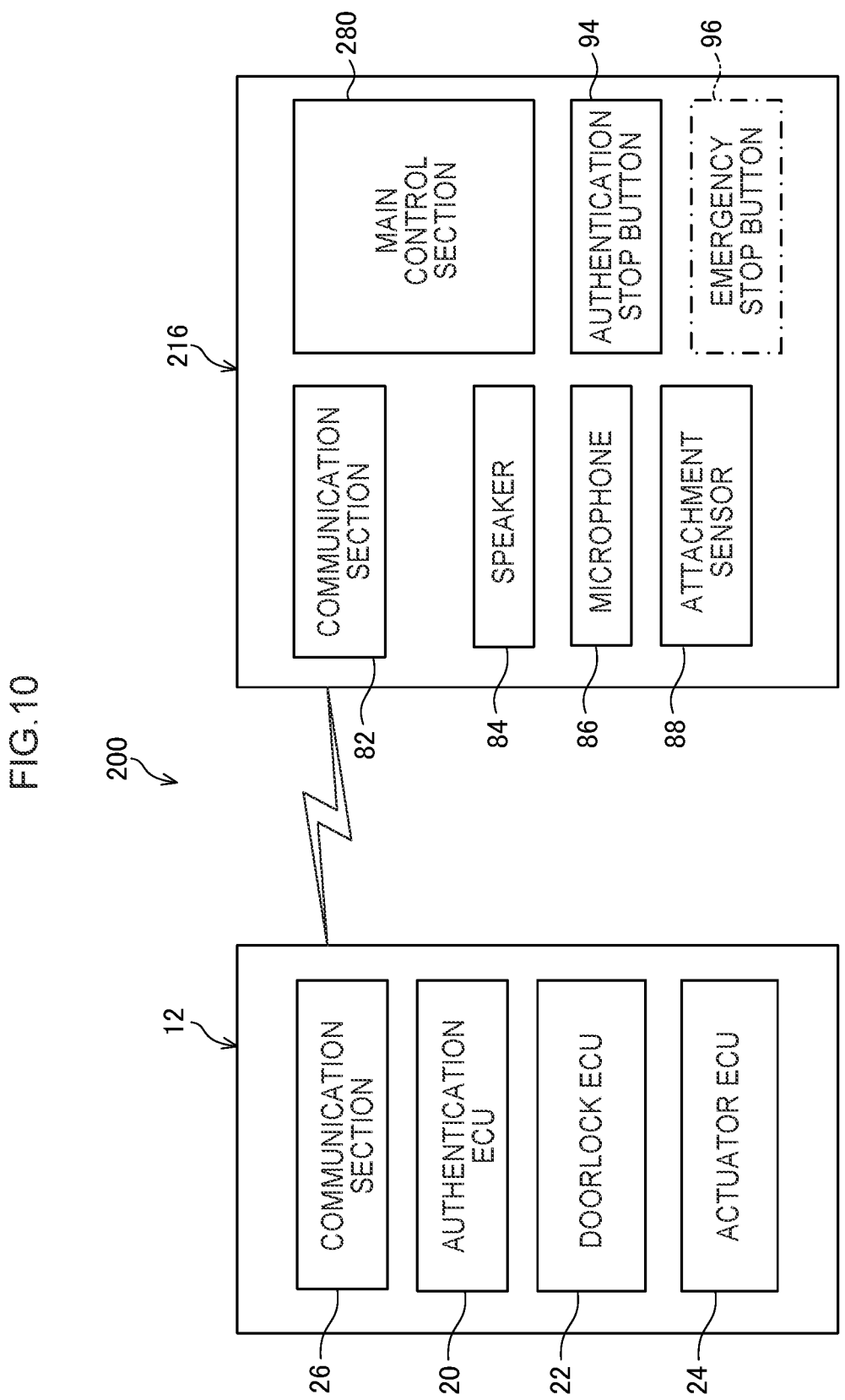
FIG. 10 is a schematic diagram showing overall structure of an information processing system according to a second exemplary embodiment.

As shown in FIG. 10, the information processing system 200 includes the vehicle 12 and a hearable device 216. The vehicle 12 is equivalent to the "target" and the hearable device 216 is equivalent to the "information processing device".

That is, all functions conducted by the smartphone 14 and hearable device 16 according to the first exemplary embodiment are conducted by the hearable device 216.

As shown in FIG. 10, the communication section 26 of the vehicle 12 and the communication section 82 of the hearable device 216 are capable of communicating with Bluetooth (registered trademark) signals.

Now, hardware structures of a main control section 280 are described. The hardware structures of the main control section 280 are similar to the main control section 80 according to the first exemplary embodiment. Therefore, the reference symbols in FIG. 2 are assigned to a CPU 280A to a bus 280F, and detailed descriptions thereof are not given here.

Figure 11:
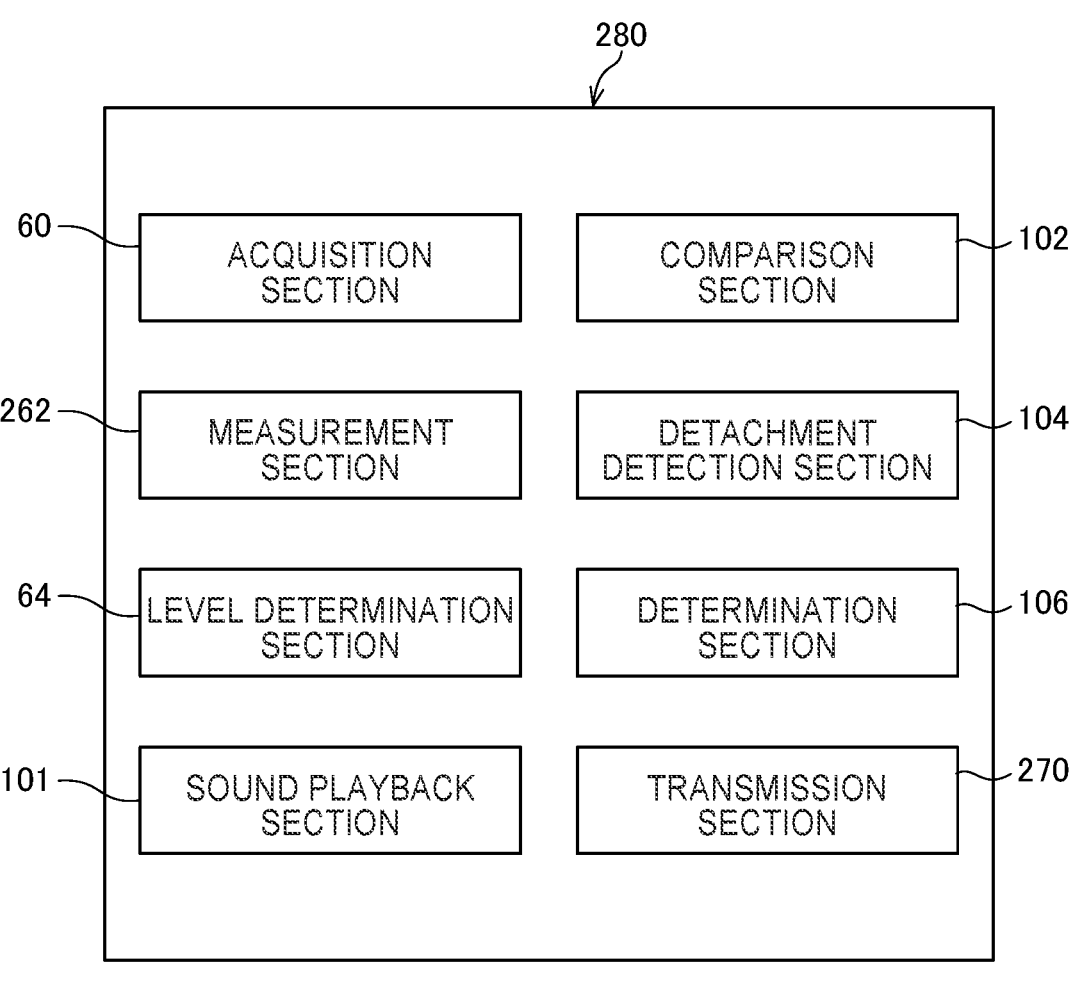
FIG. 11 is a block diagram showing functional structures of a main control section of a hearable device according to the second exemplary embodiment.

Functional structures of the main control section 280 of the hearable device 216 are described with reference to FIG. 11.

The main control section 280 is provided with the acquisition section 60, a measurement section 262, the level determination section 64, the sound playback section 101, the comparison section 102, the detachment detection section 104, the determination section 106 and a transmission section 270.

At the main control section 280 of the hearable device 216, authentication request signals from the vehicle 12 are received by the acquisition section 60 and operation substance information relating to the vehicle 12 is acquired.

At the measurement section 262, electromagnetic waves outputted from the vehicle 12 are received by the communication section 82, and the distance L between the vehicle 12 and the hearable device 216 is measured (estimated) from strength of the electromagnetic waves.

On the basis of a determination result at the level determination section 64 (the high-level authentication request signals or low-level authentication request signals), the sound playback section 101 outputs the audible range sound or inaudible range sound for otoacoustic authentication.

The transmission section 270 transmits operation permission signals to the vehicle 12 only when the determination section 106 determines that the authentication is a success.

Thus, the information processing system 200 provides the same operational effects as the information processing system 10, in addition to which, because the vehicle 12 and the hearable device 216 communicate directly to conduct authentication, this configuration is simpler.

In the hearable device 216, guidance on content of the event display and user operation guidance display, which are displayed at the display section 54 of the smartphone 14 according to the first exemplary embodiment, may be given by sound output (audible range sound) by the sound playback section 101.

Third Exemplary Embodiment

An information processing system 300 according to the third exemplary embodiment is described. Parts with the same functions as in the information processing system 10 according to the first exemplary embodiment are assigned the same reference symbols and detailed descriptions thereof are not given here. Whereas the information processing systems according to the first and second exemplary embodiments control the vehicle 12, this system controls a smart home 302.

As shown in FIG. 12, the information processing system 300 includes the smart home 302, the smartphone 14 and the hearable device 16. The smart home 302 is equivalent to the "target".

The smart home 302 includes a locking and unlocking device 304 that locks and unlocks a door and the like of the smart home 302, an air conditioning device 306 that performs air conditioning in the smart home 302, and a control device 308 that centrally controls these devices.

The control device 308 is, for example, a Home Energy Management System (HEMS).

The smart home 302 includes a communication section 312 that is capable of connecting to an external network 310.

Meanwhile, the smartphone 14 includes a first communication section 314 that is also capable of connecting to the external network 310.

Thus, in the information processing system 300, (the communication section 312 of) the smart home 302 and (the first communication section 314 of) the smartphone 14 are capable of transmitting and receiving signals via the network 310.

Consequently, even when a user carrying the smartphone 14 is located in a place distant from the smart home 302, the smart home 302 may be operated from the smartphone 14. Moreover, when the smart home 302 is operated, biometric authentication of the user of the smart home 302 carrying the smartphone 14 may be carried out by the hearable device 16.

In contrast to the vehicle 12, the location of the smart home 302 is fixed. Therefore, a distance L between the smart home 302 and the smartphone 14 may be measured by acquiring location information of the smartphone 14 from a GPS system, and measuring (calculating) the distance between the two from the location information of the smartphone 14 and location information of the smart home 302.

Thus, because biometric authentication with the hearable device 16 is possible even when the user is in a place that is distant from the smart home 302, an operation relating to the smart home 302 by a third party may be prevented. Further, because the otoacoustic authentication is carried out with inaudible range sound when an operation relating to the smart home 302 is not a security unlocking operation or the distance between the smart home 302 and (the user carrying) the smartphone 14 is less than a predetermined distance, annoyance to the user is prevented. In other words, user-friendliness for users when biometric authentication is conducted by sound may be improved.

Similarly to the second exemplary embodiment, the present exemplary embodiment may be configured with only the smart home 302 and the hearable device 16.

The meaning of the term "security unlocking operation" as used for the smart home 302 is intended to include an operation such that security of the smart home 302 is impaired, for example, an operation with a risk of allowing an intruder inside the smart home 302, more specifically, an operation of unlocking a door, a window or the like. Operations that do not correspond to security unlocking operations in the smart home 302 include operations of lighting and the like.

ALTERNATIVES

In the first to third exemplary embodiments, otoacoustic authentication (biometric authentication) is implemented with audible range sound only when a distance between the smartphone 14 or hearable device 16 and the vehicle 12 or smart home 302 is greater than or equal to a predetermined distance and an operation relating to the vehicle 12 or smart home 302 is a security unlocking operation, but this is not limiting.

For example, the otoacoustic authentication (biometric authentication) may be implemented with audible range sound when a distance between the smartphone 14 or hearable device 16 and the vehicle 12 or smart home 302 is greater than or equal to a predetermined distance regardless of operation substance.

Alternatively, the otoacoustic authentication (biometric authentication) may be implemented with the audible range sound when an operation relating to the vehicle 12 or smart home 302 is a security unlocking operation regardless of a distance between the smartphone 14 or hearable device 16 and the vehicle 12 or smart home 302.

As a further alternative, when operation signals are inputted to the vehicle 12 or smart home 302 from an operation terminal, the otoacoustic authentication (biometric authentication) may be implemented with the audible range sound when an ID of the operation terminal does not match an ID of an operation terminal of a legitimate user, and the otoacoustic authentication may be implemented with the inaudible range sound when the ID of the operation terminal does match an ID of an operation terminal of a legitimate user.

For this alternative, a configuration can be considered in which (the authentication ECU 20 of) the vehicle 12 or (the control device 308 of) the smart home 302 is provided with an ID acquisition section that acquires the ID of the operation terminal and (the main control section 50 of) the smartphone 14 or (the main control section 80 of) the hearable device 16 is provided with an ID identification section.

In the exemplary embodiments described above, when the high level is determined at the smartphone 14, the otoacoustic authentication (biometric authentication) is always implemented with audible range sound at the hearable device 16, but this is not limiting. For example, when the otoacoustic authentication (biometric authentication) is implemented with the audible range sound and the authentication is successful, otoacoustic authentications (biometric authentications) may be implemented with the inaudible range sound until the hearable device 16 is detached from the ear of the user or a power supply is turned off. When otoacoustic authentications (biometric authentications) are implemented with the audible range sound, playback of music is paused or muted and the authentication starting message is played at each time of authentication. However, if otoacoustic authentications (biometric authentications) are implemented with the inaudible range sound temporarily when an authentication is successful, annoyances to the user at each time of authentication such as interruption of music, playing of the authentication starting message, playing of audible sound authentication data and the like may be moderated.

Assignment of situations between situations for biometric authentication with the audible range sound and situations for biometric authentication with the inaudible range sound are arbitrary and may be specifiable by a user.

In the first to third exemplary embodiments, when a user carries out an operation (detaching the hearable device 16) during biometric authentication with the audible range sound, this is treated as an authentication failure and an operation relating to the vehicle 12 by a third party is not implemented. However, the operation carried out by the user is not limited thus.

For example, a configuration is possible in which an emergency stop button 96 is provided at the hearable device 16 (see the single-dot chain lines in FIG. 1, FIG. 10 and FIG. 12). When the user presses the emergency stop button 96, emergency stop signals are transmitted from the hearable device 16 via the smartphone 14, or from the hearable device 16 directly, to the vehicle 12 or smart home 302, and all operations at the vehicle 12 or smart home 302 are stopped.

An alternative configuration is possible in which a similar emergency stop button is displayed at the display section 54 of the smartphone 14. When the user touches this emergency stop button, emergency stop signals are transmitted from the smartphone 14 to the vehicle 12 and all operations at the vehicle 12 are stopped.

In the first to third exemplary embodiments, a distance between the vehicle 12 or smart home 302 and the smartphone 14 or hearable device 16 is measured from electromagnetic wave strengths or from location information based on GPS. However, a distance measurement method is not limited thus.

In the first exemplary embodiment, the first communication section 52 of the smartphone 14 is utilized for communication with (the communication section 26 of) the vehicle 12, and the second communication section 53 is utilized for communication with (the communication section 82 of) the hearable device 16. However, a single communication section may be capable of both kinds of communication, by distribution of channels.

In the first to third exemplary embodiments, short-range wireless communications are conducted by Bluetooth (registered trademark), but alternative wireless communications such as Wi-Fi (registered trademark) and the like are possible.

The target that is a target of control is described as being the vehicle 12 and the smart home 302, but a target of control is not particularly limited. For example, the target may be equipment connected to the smartphone 14 such as a payment terminal, an electronic key or the like.

While the information processing system 10 has been described in relation to the exemplary embodiments above, numerous modes may be embodied within a scope not departing from the gist of the present disclosure.

The processing that, in the exemplary embodiments described above, is executed by CPUs loading software (programs) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

The exemplary embodiments described above have configurations in which various kinds of data are memorized in storage, but this is not limiting. For example, a non-transitory recording medium such as a CD (compact disc), DVD (digital versatile disc), USB (universal serial bus) memory or the like may be used as a memory section. In this case, various programs, data and the like are stored at this recording medium.

An object of the present disclosure is to provide an information processing device, and an information processing method that improve user-friendliness for users when biometric authentication is conducted by sound.

A first aspect of the present disclosure is an information processing device controlling a target, the information processing device including: a memory; and a processor coupled to the memory, the processor being configured to: measure a distance between the information processing device and the target; based on the distance, perform control to selectively implement: biometric authentication processing of a user of the target with audible range sound, or biometric authentication processing of the user with inaudible range sound; and control the target based on a result of the biometric authentication processing.

In this information processing device, for example, when the target is operated, sound is used to implement the biometric authentication processing of the user and the target is controlled on the basis of a result of the biometric authentication. When, for example, the biometric authentication is successful, control is performed to permit operation of the target. On the other hand, when the biometric authentication is unsuccessful, control is performed to prohibit the operation of the target. Thus, when biometric authentication is unsuccessful, operation of the target is disabled. Therefore, operation of the target by a third party may be prevented.

In this information processing device, when, for example, the target is operated, a distance between the information processing device carried by the user and the target is measured. On the basis of the measured distance between the information processing device and the target, the biometric authentication processing is implemented selectively using the audible range sound or the inaudible range sound.

When, for example, (the user carrying) the information processing device is distant from the target, the biometric authentication processing of the user is implemented with the audible range sound. As a result, the user may be assuredly made aware of the operation relating to the target.

On the other hand, when (the user carrying) the information processing device is close to the target, the biometric authentication processing of the user is implemented with the inaudible range sound. When (the user carrying) the information processing device is located in the vicinity of the target, a probability that the user is operating the target is high. Even if a third party performs an operation relating to the target, a probability of the user being aware of (seeing) (the state of) the target is high. Accordingly, by conducting authentication with the inaudible range sound, annoyance for the user may be moderated.

A second aspect of the present disclosure is the information processing device according to the first aspect, wherein the processor is configured to perform control to: implement the biometric authentication processing of the user with the audible range sound in response to the distance being at least a predetermined distance, and implement the biometric authentication processing of the user with the inaudible range sound in response to the distance being less than the predetermined distance.

In this information-processing device, when the acquired distance between the information processing device and the target is at least the predetermined distance, the biometric authentication processing is implemented with the audible range sound. Therefore, when the user (carrying the information processing device) is the predetermined distance or more from the target and may have difficulty checking (the state of) the target, the user may be made aware that an operation relating to the target has been performed.

Alternatively, when the measured distance between the information processing device and the target is less than the predetermined distance, that is, when (the user carrying) the information processing device is located (in a range) less than the predetermined distance from the target, the biometric authentication processing is implemented with the inaudible range sound. When (the user carrying) the information processing device is located in the vicinity of the target, a probability that the user is operating the target is high, and even if a third party performs an operation relating to the target, a probability of the user being aware of (seeing) (the state of) the target is high. Accordingly, by conducting authentication with the inaudible range sound, annoyance for the user may be moderated.

A third aspect of the present disclosure is an information processing device controlling a target, the information processing device including: a memory and a processor coupled to the memory, the processor being configured to: acquire substance of an operation relating to the target; based on the acquired operation substance, perform control to selectively implement: biometric authentication processing of a user of the target with audible range sound, or biometric authentication processing of the user with inaudible range sound; and control the target based on a result of the biometric authentication processing.

In this information processing device, for example, when the target is operated, sound is used to implement the biometric authentication processing of the user and the target is controlled on the basis of a result of the biometric authentication. When, for example, the biometric authentication is successful, control is performed to permit operation of the target. On the other hand, when the biometric authentication is unsuccessful, control is performed to prohibit the operation of the target. Therefore, operation of the target by a third party may be prevented.

In this information processing device, when, for example, the target is operated, substance of the operation relating to the target is acquired. On the basis of the operation substance, the biometric authentication processing of the user is implemented selectively using the audible range sound or the inaudible range sound.

When, for example, the operation substance is of an operation that enables an intrusion into the interior of the target, the biometric authentication processing of the user is conducted using the audible range sound. That is, because the biometric authentication is implemented with the audible range sound when an operation that allows intrusion into the interior of the target is performed, the user (carrying the information processing device) may be made aware that an operation enabling intrusion into the interior of the target is being performed on the target.

Alternatively, when the operation substance is not of an operation that enables an intrusion into the interior of the target, the biometric authentication processing of the user is conducted using the inaudible range sound. Thus, annoyance of the user due to audible range sound at each time of biometric authentication may be suppressed, and user-friendliness for the user may be assured.

A fourth aspect of the present disclosure is the information processing device according to the third aspect, wherein the processor is configured to perform control to: implement the biometric authentication processing of the user with the audible range sound in response to the operation substance being a security unlocking operation of the target, and implement the biometric authentication processing of the user with the inaudible range sound in response to the operation substance not being the security unlocking operation of the target.

When the substance of an operation relating to the target is of a security unlocking operation of the target, this information processing device uses audible range sound to implement the biometric authentication processing of the user. That is, because the biometric authentication processing of the user is implemented with the audible range sound when a security unlocking operation is performed in relation to the target, the user (carrying the information processing device) may be made aware that the security unlocking operation is being performed on the target.

On the other hand, when the substance of the operation is not of a security unlocking operation of the target, the biometric authentication processing of the user is conducted using inaudible range sound. Thus, annoyance of the user due to audible range sound at each time of biometric authentication may be suppressed, and user-friendliness for the user may be assured.

The meaning of the term "security unlocking operation" as used herein is intended to include an operation associated with theft of all or part of the target and an operation that enables intrusion into the interior of the target (an operation associated with theft of valuables (the user's personal property or the like) inside the target or the like).

A fifth aspect of the present disclosure is the information processing device according to any of the first to the fourth aspect, wherein the processor is configured to perform control such that an authorizer that is a separate body from the information processing device selectively implements the biometric authentication processing of the user with the audible range sound or the biometric authentication processing of the user with the inaudible range sound.

With this information processing device, the biometric authentication processing may be implemented using the audible range sound or inaudible range sound at the authorizer that is provided as a separate body from the information processing device.

A sixth aspect of the present disclosure is the information processing device according to the fifth aspect, wherein the authorizer: includes a speaker and a microphone, is attachable to an ear of the user, and is configured such that the biometric authentication processing of the user implemented by the authorizer includes: via the speaker, selectively outputting sound in an audible range or an inaudible range; via the microphone, acquiring echo sound of the outputted sound; extracting a feature from the echo sound; and comparing the feature with a pre-registered feature of a legitimate user of the targets.

The authorizer that is a separate body from the information processing device is attachable to an ear of the user. Accordingly, in a state in which the authorizer is attached to the ear of the user, biometric authentication is implemented by the authorizer outputting the audible range sound or inaudible range sound into the earhole of the user, extracting a feature from echo sound that is acquired, and checking the feature against registered characteristic quantities of legitimate users of the target.

Thus, because the authorizer is attached to the ear of the user, biometric authentication processing of the user by sound may be carried out accurately.

A seventh aspect of the present disclosure is the information processing device according to any of the first to the fourth aspect, further including a speaker and a microphone, wherein the processor is configured to, via the speaker and the microphone, selectively implement the biometric authentication processing of the user with the audible range sound or the biometric authentication processing of the user with the inaudible range sound.

In this information processing device, because the biometric authentication processing of the user may be implemented using the audible range sound or inaudible range sound, either of biometric authentication processing of the user using the audible range sound and biometric authentication processing of the user using the inaudible range sound may be selectively implemented.

An eighth aspect of the present disclosure is the information processing device according to the seventh aspect, wherein the information processing device is attachable to an ear of the user, and the biometric authentication processing of the user implemented by the processor includes: via the speaker, selectively outputting sound in an audible range or an inaudible range; via the microphone, acquiring echo sound of the outputted sound; extracting a feature from the echo sound; and comparing the feature with a pre-registered feature of a legitimate user of the target.

This information processing device is attachable to an ear of the user. Accordingly, in a state in which the information processing device is attached to the ear of the user, biometric authentication processing is implemented by the information processing device outputting the audible range sound or inaudible range sound into the earhole of the user, extracting a feature from echo sound that is acquired, and checking the feature against registered characteristic quantities of legitimate users of the target.

Thus, because the information processing device is attached to the ear of the user, biometric authentication processing of the user by sound may be carried out accurately.

A ninth aspect of the present disclosure is the information processing device according to any of the first to the eighth aspect, wherein the processor is configured to: recognize an operation by the user in response to the biometric authentication processing of the user being implemented with the audible range sound; and control the target based on the result of the biometric authentication processing and the recognized operation by the user.

In this information processing device, when the biometric authentication processing of the user is implemented with the audible range sound, an operation by the user is recognized. The target is then controlled on the basis of both the result of the biometric authentication processing of the user and the recognized user operation.

Therefore, when a user who has been made aware of an operation relating to the target by the biometric authentication processing of the user with the audible range sound performs the user operation, the user operation is recognized. The target is controlled on the basis of the recognized user operation and the result of the biometric authentication.

For example, the user may be made aware of an operation relating to the target by a third party, by the biometric authentication processing of the user with the audible range sound. A user operation for blocking the third party operation may be recognized and, in accordance with the substance of this user operation, the target may be controlled so as not to implement the substance of the operation by the third party.

A tenth aspect of the present disclosure is an information processing method, including, by a processor: measuring a distance between an information processing device and a target; based on the measured distance, performing control to selectively implement: biometric authentication processing of a user of the target with audible range sound, or biometric authentication processing of the user with inaudible range sound; and controlling the target based on a result of the biometric authentication processing.

This information processing method provides the same operational effects as the first aspect.

An eleventh aspect of the present disclosure is an information processing method comprising, by a processor: acquiring substance of an operation relating to a target; based on the acquired operation substance, performing control to selectively implement: biometric authentication processing of a user of the target with audible range sound, or biometric authentication processing of the user with inaudible range sound; and controlling the target based on a result of the biometric authentication processing.

This information processing method provides the same operational effects as the third aspect.

The present disclosure may improve user-friendliness for users when biometric authentication is conducted by sound.

What is claimed is:

1. An information processing device controlling a target vehicle, the information processing device comprising:
a memory; and
a processor coupled to the memory, the processor being configured to:
measure a distance between the information processing device and the vehicle;
compare the measured distance to a predetermined distance;
when the measured distance is greater than or equal to the predetermined distance, implement biometric authentication processing of a user of the vehicle with audible range sound, and execute event display processing and user operation guidance processing to display guidance on a display section of the vehicle;
when the measured distance is less than the predetermined distance, implement biometric authentication processing of the user of the vehicle with inaudible range sound; and
control the vehicle based on a result of the biometric authentication processing,
wherein when the biometric authentication processing with audible range sound is not successful, the processor is configured to execute reattachment display processing to display a reattachment notice on the display section of the vehicle.

2. The information processing device according to claim 1, wherein the processor is configured to perform control such that an authorizer that is a separate body from the information processing device selectively implements the biometric authentication processing of the user with the audible range sound or the biometric authentication processing of the user with the inaudible range sound, the authorizer being attachable to an ear of the user and including a speaker and a microphone.

3. The information processing device according to claim 2, wherein the authorizer is configured such that the biometric authentication processing of the user implemented by the authorizer includes:

selectively outputting sound in an audible range or an inaudible range;

acquiring echo sound of the outputted sound;

extracting a feature from the echo sound; and comparing the feature with a pre-registered feature of a legitimate user of the vehicle.

4. The information processing device according to claim 2, wherein the processor is configured to control the authorizer via the speaker and microphone to selectively implement the biometric authentication processing of the user with the audible range sound or the biometric authentication processing of the user with the inaudible range sound.

5. The information processing device according to claim 4, wherein the information processing device is attachable to the ear of the user, and the biometric authentication processing of the user implemented by the processor includes:

the speaker, selectively outputting sound in an audible range or an inaudible range;

via the microphone, acquiring echo sound of the outputted sound;

extracting a feature from the echo sound; and comparing the feature with a pre-registered feature of a legitimate user of the vehicle.

6. The information processing device according to claim 1, wherein the processor is configured to:

recognize an operation by the user in response to the biometric authentication processing of the user being implemented with the audible range sound; and control the vehicle based on the result of the biometric authentication processing and the recognized operation by the user.

7. An information processing device controlling a vehicle, the information processing device comprising:

a memory and a processor coupled to the memory, the processor being configured to:

acquire substance of an operation relating to the vehicle;

when the operation substance is a security unlocking operation of the vehicle, implement biometric authentication processing of a user of the vehicle with audible range sound, and execute event display processing and user operation guidance processing to display guidance on a display section of the vehicle;

when the operation substance is not the security unlocking operation of the vehicle, implement biometric authentication processing of the user of the vehicle with inaudible range sound; and control the vehicle based on a result of the biometric authentication processing, wherein when the biometric authentication processing with audible range sound is not successful, the processor is configured to execute reattachment display processing to display a reattachment notice on the display section of the vehicle.

8. The information processing device according to claim 7, wherein the processor is configured to perform control such that an authorizer that is a separate body from the information processing device selectively implements the biometric authentication processing of the user with the audible range sound or the biometric authentication processing of the user with the inaudible range sound, the authorizer being attachable to an ear of the user and including a speaker and a microphone.

9. The information processing device according to claim 8, wherein the authorizer is configured such that the biometric authentication processing of the user implemented by the authorizer includes:

via the speaker, selectively outputting sound in an audible range or an inaudible range;

via the microphone, acquiring echo sound of the outputted sound;

extracting a feature from the echo sound; and comparing the feature with a pre-registered feature of a legitimate user of the vehicle.

10. The information processing device according to claim 8, further wherein the processor is configured to, via the speaker and the microphone, selectively implement the biometric authentication processing of the user with the audible range sound or the biometric authentication processing of the user with the inaudible range sound.

11. The information processing device according to claim 10, wherein the information processing device is attachable to the ear of the user, and the biometric authentication processing of the user implemented by the processor includes:

via the speaker, selectively outputting sound in an audible range or an inaudible range;

via the microphone, acquiring echo sound of the outputted sound;

extracting a feature from the echo sound; and comparing the feature with a pre-registered feature of a legitimate user of the vehicle.

12. The information processing device according to claim 7, wherein the processor is configured to:

recognize an operation by the user in response to the biometric authentication processing of the user being implemented with the audible range sound; and control the vehicle based on the result of the biometric authentication processing and the recognized operation by the user.

13. An information processing method, comprising, by a processor:

measuring a distance between an information processing device and a vehicle;

comparing the measured distance to a predetermined distance;

when the measured distance is greater than or equal to the predetermined distance, implementing biometric authentication processing of a user of the target with audible range sound, and executing event display processing and user operation guidance processing to display guidance on a display section of the vehicle;

when the measured distance is less than the predetermined distance, implementing biometric authentication processing of the user of the vehicle with inaudible range sound; and controlling the vehicle based on a result of the biometric authentication processing, wherein when the biometric authentication processing with audible range sound is not successful, the method further comprises executing reattachment display processing to display a reattachment notice on the display section of the vehicle.

14. An information processing method comprising, by a processor:

acquiring substance of an operation relating to a vehicle;

when the operation substance is a security unlocking operation of the vehicle, implementing biometric authentication processing of a user of the target with audible range sound, and executing event display processing and user operation guidance processing to display guidance on a display section of the vehicle;

when the operation substance is not the security unlocking operation of the vehicle, implementing biometric authentication processing of the user of the vehicle with inaudible range sound; and controlling the vehicle based on a result of the biometric authentication processing, wherein when the biometric authentication processing with audible range sound is not successful, the method further comprises executing reattachment display processing to display a reattachment notice on the display section of the vehicle.

* * * * *